United States Patent
Roberts et al.

(10) Patent No.: US 7,822,342 B1
(45) Date of Patent: Oct. 26, 2010

(54) SECURE QUANTUM OPTICAL COMMUNICATIONS SYSTEM AND METHOD

(75) Inventors: Mark W. Roberts, San Diego, CA (US); Markham E. Lasher, La Jolla, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 881 days.

(21) Appl. No.: 11/725,718

(22) Filed: Mar. 20, 2007

Related U.S. Application Data

(63) Continuation-in-part of application No. 10/989,139, filed on Nov. 15, 2004, now Pat. No. 7,330,653.

(51) Int. Cl.
*H04B 10/00* (2006.01)
*H04K 1/00* (2006.01)

(52) U.S. Cl. .................. 398/40; 398/39; 398/140; 398/152; 380/44; 380/255; 380/256

(58) Field of Classification Search ............ 398/39, 398/40, 140, 118, 152; 380/44, 255–278
See application file for complete search history.

(56) References Cited

U.S. PATENT DOCUMENTS

| | | | |
|---|---|---|---|
| 5,243,649 A | 9/1993 | Franson | |
| 5,418,905 A * | 5/1995 | Rarity et al. | ................. 398/40 |
| 5,659,412 A * | 8/1997 | Hakki | ....................... 398/152 |
| 5,757,912 A | 5/1998 | Blow | |
| 5,764,765 A | 6/1998 | Phoenix | |
| 5,768,378 A | 6/1998 | Townsend | |
| 5,793,871 A | 8/1998 | Jackson | |
| 5,850,441 A | 12/1998 | Townsend | |
| 5,864,625 A | 1/1999 | Rutledge | |
| 5,953,421 A | 9/1999 | Townsend | |
| 5,999,285 A | 12/1999 | Brandt | |
| 6,028,935 A * | 2/2000 | Rarity et al. | ................. 380/256 |
| 6,272,224 B1 | 8/2001 | Mazourenko | |
| 6,314,189 B1 * | 11/2001 | Motoyoshi et al. | ........... 380/278 |
| 6,778,669 B1 | 8/2004 | Lehureau | |
| 6,897,434 B1 * | 5/2005 | Kumar et al. | ........... 250/227.18 |
| 6,917,031 B1 | 7/2005 | Sun | |
| 7,113,598 B2 * | 9/2006 | Flusberg et al. | .............. 380/256 |
| 7,126,691 B2 * | 10/2006 | Gat | ............................ 356/450 |

(Continued)

OTHER PUBLICATIONS

Mattle et al: "Dense Coding in Experimental Quantum Communication", Physical Review Letters, vol. 76, No. 25, Jun. 17, 1996, pp. 4656-4659.*

(Continued)

*Primary Examiner*—Li Liu
(74) *Attorney, Agent, or Firm*—Kyle Eppele; Peter A. Lipovsky

(57) ABSTRACT

An optical communication system is provided. In one embodiment, a source creates a multiplicity of photon pairs, with each photon pair comprising a first photon and a second photon. The first photon is sent to a transmitter, and either remains in the transmitter or is transmitted by the transmitter to a receiver. The second photon is sent to the receiver. Data is decoded by determining a polarization direction and a time of detection of any photon pairs detected at the receiver.

8 Claims, 8 Drawing Sheets

U.S. PATENT DOCUMENTS

2003/0123516 A1* 7/2003 Steinberg et al. ............ 372/102
2004/0086118 A1   5/2004 Sweetser et al.
2006/0083379 A1   4/2006 Brookner
2006/0153573 A1* 7/2006 Tomaru ...................... 398/152

OTHER PUBLICATIONS

Pan et al: "Greeberger-Horne-Zeilinger-State analyzer", Physical Review A, Vo. 57, No. 3, Mar. 1998, pp. 2208-2211.*

Li et al: "Quantum Dense Coding Exploiting a Bright Einstein-Podolsky-Rosen Beam", Physical Review Letters, vol. 88, No. 4, Jan. 28, 2002, pp. 047904-1 to 047904-4.*

Dimitris Syvridis and Antonis Bogris, "Secure Communications Links Based on Chaotic Optical Carriers"; SPIE Newsroom, 10.1117/2.1200611.0486, 2006—The International Society for Optical Engineering.

* cited by examiner

US 7,822,342 B1

SECURE QUANTUM OPTICAL COMMUNICATIONS SYSTEM AND METHOD

CROSS-REFERENCE TO RELATED APPLICATION

This application is a continuation-in-part of prior U.S. patent application Ser. No. 10/989,139 filed 15 Nov. 2004 now U.S. Pat. No. 7,330,653. This related application is incorporated by reference herein.

FEDERALLY-SPONSORED RESEARCH AND DEVELOPMENT

This invention (Navy Case No. 97440) was developed with funds from the United States Department of the Navy. Licensing inquiries may be directed to Office of Research and Technical Applications, Space and Naval Warfare Systems Center, San Diego, Code 2112, San Diego, Calif. 92152; telephone (619) 553-2778; email: T2@spawar.navy.mil.

BACKGROUND OF THE INVENTION

1. Field of the Invention

The present invention relates generally to communications systems. More specifically, but without limitation thereto, the present invention relates to a quantum optical communication system that provides secure communications.

2. Description of the Related Art

To provide security for transmitted information, traditional optical communications systems require that the information be encrypted during transmission. Encryption is the procedure used in cryptography to convert "plaintext" into "ciphertext" in order to prevent anyone except the intended recipient from reading that data. Put differently, one of cryptography's primary purposes is hiding the meaning of messages, not the existence of such messages.

There are many types of data encryption, and they are the basis of network security. Data encryption techniques can be used to increase the security in data exchange and transfer over a shared transmission channel. In its simplest form, data encryption uses a "key" based on a particular algorithm to change the sequence of a package of data that contains a piece of confidential information ("plaintext") so that the data is enciphered or "scrambled" into a form that appears to have no correlation with the embedded confidential information ("ciphertext"). An unauthorized user, who does not have the knowledge of either the encryption method (i.e., the encryption algorithm) or the key based on the encryption method, cannot easily decode the information. An authorized user recovers the embedded information in the scrambled data by using the "key" that is constructed based on the encryption method. Therefore, even if the unauthorized user obtains the scrambled data, the knowledge of both of the encryption method and the particular key is needed to decrypt the confidential information embedded therein.

However, even if a message is encrypted, any eavesdropper who has access to the communications channel can still detect and record the ciphertext of the message. Once the ciphertext is recorded, the eavesdropper is free to apply whatever present (or future) techniques are available in order to obtain the plaintext message from the ciphertext.

Current encryption methods are subject to various threats. For example, if the "level" of encryption of a message is not high enough, then the plaintext of the message may be obtained from the ciphertext by "brute-force" computation using a super-computer. Also, current encryption methods rely heavily on the fact that it is difficult to find the prime factors of very large numbers. However, there is no mathematical proof that prevents the existence of a fast factoring algorithm. Therefore, it is possible that a fast algorithm to find the prime factors of very large numbers may be found in the future. This would compromise many modern encryption methods.

Therefore, it would be advantageous to provide an improved means of secure data transfer.

SUMMARY OF THE INVENTION

The optical communication system described herein is directed to overcoming the problems described above, and may provide further related advantages. No embodiment of the optical communication system described herein shall preclude other embodiments or advantages that may exist or become obvious to those skilled in the art.

In one embodiment, a source creates a multiplicity of photon pairs, with each photon pair comprising a first photon and a second photon. The first photon is sent to a transmitter, and either remains in the transmitter or is transmitted by the transmitter to a receiver. The second photon is sent to the receiver. A polarization direction and a time of detection of any photon pairs detected at the receiver are then determined. Data is then decoded from the polarization direction and time of detection of the photon pairs detected at the receiver.

Figure 1:
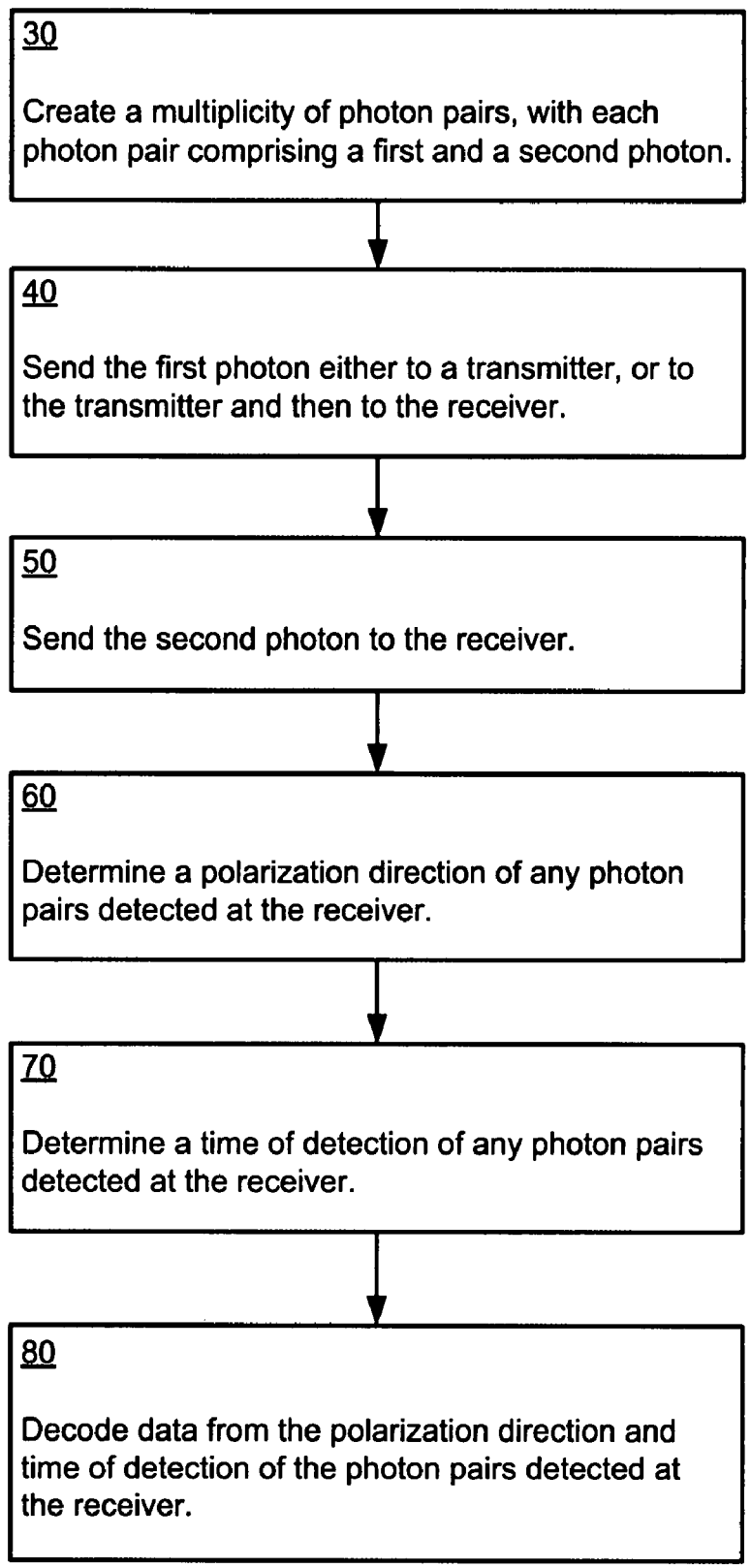
FIG. 1 is a flow chart illustrating a method of communication using one embodiment of the optical communication system.

It will be recognized that some or all of the Figures are schematic representations for purposes of illustration and do not necessarily depict the actual relative sizes or locations of the elements shown. The Figures are provided for the purpose of illustrating one or more embodiments of the optical communication system with the explicit understanding that they will not be used to limit the scope or the meaning of the claims.

DETAILED DESCRIPTION OF THE EMBODIMENTS

In the following paragraphs, embodiments of a secure optical communication system will be described in detail by way of example with reference to the attached drawings. While this optical communication system is capable of embodiment in many different forms, there is shown in the drawings and will herein be described in detail specific embodiments, with the understanding that the present disclosure is to be considered as an example of the principles of the optical communication system and not intended to limit the optical communication system to the specific embodiments shown and described. That is, throughout this description, the embodiments and examples shown should be considered as exemplars, rather than as limitations on the optical communication system as described herein.

As illustrated in FIGS. 1-8, the optical communication system 10 described herein prevents an eavesdropper (who may have access to the communications channel) from obtaining any of the message information that is sent from the transmitter 15 to the receiver 20. The eavesdropper will be unable to recognize any message information—neither ciphertext nor plaintext—of any message that is transmitted using the optical communication system 10. This is true regardless of whether the eavesdropper uses passive or active techniques to eavesdrop, and regardless of whether the transmitted message is encrypted or not.

Referring now to FIG. 1, in one method of practicing communication through the optical communication system 10 shown in FIGS. 2-8, in a first step 30, a source 25 creates a multiplicity of photon pairs, with each photon pair comprising a first photon and a second photon. In the second step 40, the first photon is sent to a transmitter, and either remains in the transmitter or is transmitted by the transmitter to a receiver. In the third step 50, the second photon is sent to the receiver. In the fourth step 60, a polarization direction of any photon pairs detected at the receiver is determined. In the fifth step 70, a time of detection of any photon pairs detected at the receiver is determined. In the final step 80, data is then decoded from the polarization direction and time of detection of the photon pairs detected at the receiver.

Figure 2:
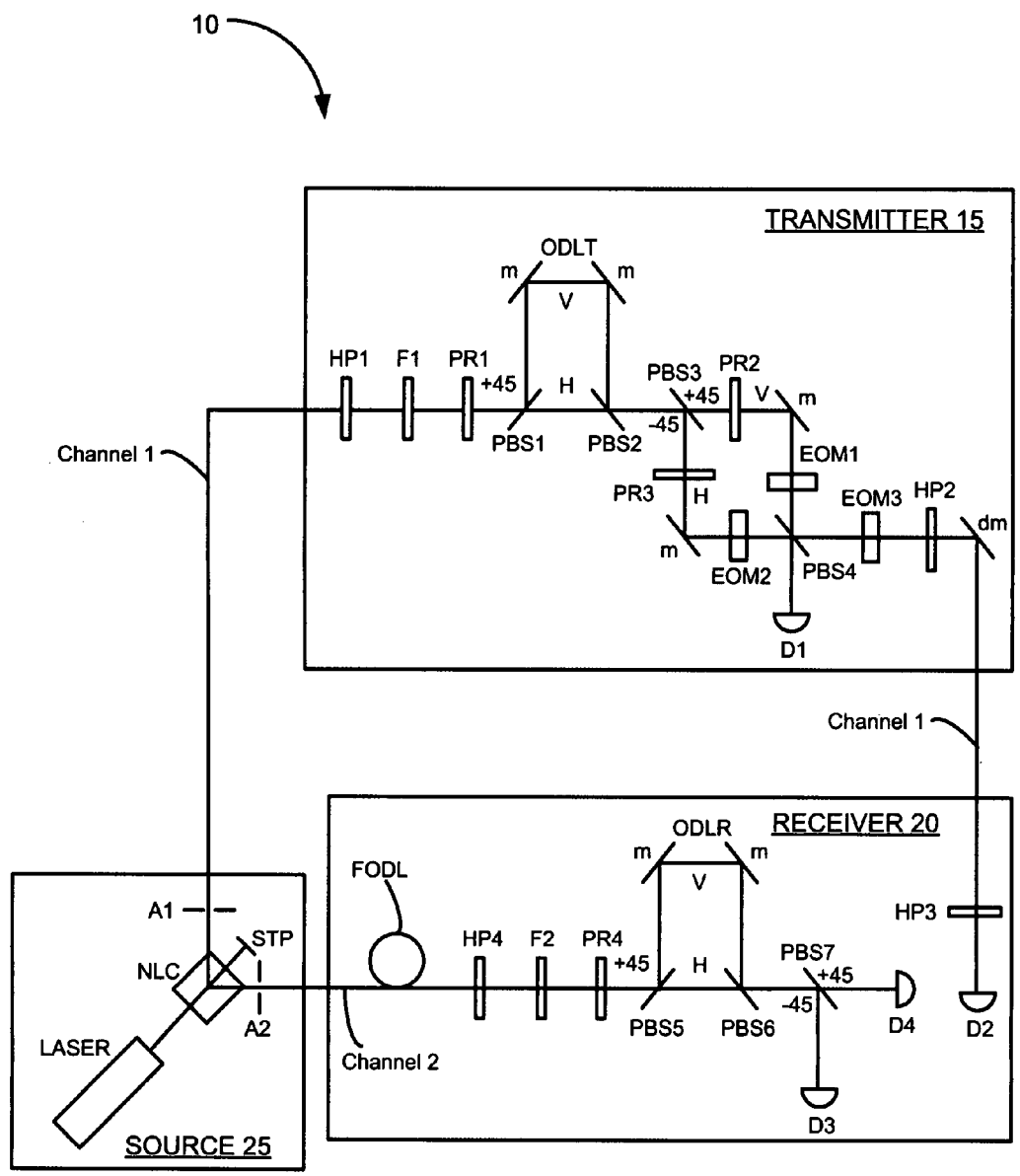
FIG. 2 is a schematic of one embodiment of the optical communication system.

As shown in FIG. 2, and summarized in the below Tables 2 and 3, in one embodiment of the optical communication system 10, message information in the form of binary digits is encoded in the relationship between the polarization directions of photons that are transmitted through a first communication channel (channel 1) and a second communication channel (channel 2). The channel 2 photon of each pair is always kept at the source 25 and the receiver 20 location, and therefore never enters the optical communication channel (channel 1) to the transmitter 15. Consequently, an eavesdropper may have access to the channel 1 photon of a pair, but never has access to the channel 2 photon, which is only transmitted from the source 25 to the receiver 20 (and which may be co-located).

Message data in the form of a multiplicity of binary zero ("0") and binary one ("1") digits are transmitted, with the channel 1 photons exiting the transmitter 15 to the receiver 20 randomly in time and always with the same polarization direction. While they are in the optical communication channel, there is no physical difference of any kind between a channel 1 photon associated with a binary zero message and a channel 1 photon associated with a binary one message. Thus, without access to the polarization direction and time of detection of the channel 2 photons, an eavesdropper can obtain absolutely no message information from observing (and detecting or analyzing) the channel 1 photons in the optical communications channel between the source 25 and the transmitter 15, or between the transmitter 15 and the receiver 20.

The below Table 1 provides a description of the figure references used in FIGS. 2-8.

TABLE 1

| Figure Reference | Description |
| --- | --- |
| A1 through A2 | Laser Aperture |
| Channel 1 and 2 | Optical communication line/cable |
| D1 through D4 | Photon Detector |
| dm | Directing mirror |
| EOM1 through EOM3 | Electro-optic Modulator |
| FODL | Fixed Length Optical Delay Line |
| F1 and F2 | Bandpass Filter |
| H | Horizontally Polarized |
| HP1 through HP4 | Polarizer |
| m | mirror |
| NLC | Non-linear crystal |
| ODLR | Optical Delay Line - Receiver |
| ODLT | Optical Delay Line - Transmitter |
| PBS1 through PBS7 | Polarizing Beam Splitter |
| PR1 through PR4 | Polarization Rotator |
| PC1 through PC4 | Photon Path Combination |
| STP | Laser Beam Stop |
| V | Vertically Polarized |

Specifically, in one embodiment of the optical communication system 10 as shown in FIGS. 2-8, the difference between a binary zero and a binary one is that for a binary zero, the only two-photon coincident detections at the receiver 20 will be of the D2/D3 (photon detector 2-3) type. For a binary one, the only two-photon coincident detections at the receiver 20 will be of the D2/D4 type. This relationship is shown in Tables 2 and 3, below. As is known in the art, coincident photon detection employs a coincidence circuit generally having one output and two (or more) inputs. The output is activated only when signals are received at the same time at both (or all) inputs.

In the optical communication system 10 data is transmitted by measuring the polarization direction of the channel 2 photon, and the detection time for both the channel 1 and channel 2 photons at the receiver. As shown in Tables 2 and 3, when a channel 2 photon is detected at photon detector D3, at the same time that a channel 1 photon is detected at photon detector D2, a binary zero is received. When a channel 2 photon is detected at photon detector D4, at the same time that a channel 1 photon is detected at photon detector D2, a binary one is received.

In this way the optical communication system 10 provides secure communications. The difference between the two binary digits (a "0" or a "1") can only be seen at the receiver 20. This is because the receiver 20 is the only device that has access to the photon in channel 2. In the optical communication system 10, the channel 2 photon remains at the source 25 and receiver 20 location. The channel 2 photon never enters the optical communication channel where it might be accessible to an eavesdropper. Only the channel 1 photon of a down-converted photon pair travels through the optical communication channel 1 to the transmitter 15, and in some cases, to the receiver 20. But the channel 1 photon carries absolutely no information as to whether a binary zero or a binary one message is being sent. In one embodiment of the optical communication system 10, the channel 1 photon exits the transmitter 15 randomly in time and is always horizontally ("H") polarized whenever it is in the optical communication channel, regardless of whether a binary zero or a binary one is being sent from the transmitter 15 to the receiver 20.

The below Tables 2 and 3 list the different photon path combinations in the optical communication system 10. Note the difference between binary zero and binary one with respect to the column "polarization from PBS3 (polarizing beam splitter 3)." For a binary zero, only channel 1 photons that are +45 degrees polarized at the output from PBS3 will be able to exit the transmitter 15 and reach detector D2 in the receiver 20. For a binary one, only channel 1 photons that are −45 degrees polarized at the output from PBS3 will be able to exit the transmitter 15 and reach detector D2 in the receiver 20. This difference is produced by the difference in "On/Off" settings of EOM1, EOM2, and EOM3 (electro-optic modulators 1-3) for binary zero versus the settings for binary one.

TABLE 2

Determination of a binary zero ("0")

| Path Combination | Detection Time Difference | Where Detected | Detection Order | Polarization from ODLT and ODLR | Polarization from PBS3 | Data from Tx to Rx | Probability per Down-Converted pair |
|---|---|---|---|---|---|---|---|
| PC1 | +T | D2 (ch. 1) in Rx and D3 or D4 (ch. 2) in Rx | Ch. 1 then Ch 2 | Ch. 1 = H Ch. 2 = V | +45° | None | 0.125 |
| PC1 | $(t_2-t_1) + T$ | D1 (ch. 1) in Tx and D3 or D4 (ch. 2) in Rx | Ch. 1 then Ch. 2 | Ch. 1 = H Ch. 2 = V | −45° | None | 0.125 |
| PC2 | −T | D2 (ch. 1) in Rx and D3 or D4 (ch. 2) in Rx | Ch. 2 then Ch. 1 | Ch. 1 = V Ch. 2 = H | +45° | None | 0.125 |
| PC2 | $(t_2-t_1) - T$ | D1 (ch. 1) in Tx and D3 or D4 (ch. 2) in Rx | Ch. 1 then Ch. 2 | Ch. 1 = V Ch. 2 = H | −45° | None | 0.125 |
| PC3/PC4 | 0 | D2 (ch. 1) in Rx and D3 (ch. 2) in Rx | Same Time | Indeterminate | +45° | Binary 0 | 0.25 |
| PC3/PC4 | $t_2-t_1$ | D1 (ch. 1) in Tx and D4 (ch. 2) in Rx | Ch. 1 then Ch. 2 | Indeterminate | −45° | None | 0.25 |

TABLE 3

Determination of a binary one ("1")

| Path Combination | Detection Time Difference | Where Detected | Detection Order | Polarization from ODLT and ODLR | Polarization from PBS3 | Data from Tx to Rx | Probability per Down-Converted pair |
|---|---|---|---|---|---|---|---|
| PC1 | +T | D2 (Ch. 1) in Rx and D3 or D4 (Ch. 2) in Rx | Ch. 1 then Ch 2 | Ch. 1 = H Ch. 2 = V | −45° | None | 0.125 |
| PC1 | $(t_2-t_1) + T$ | D1 (Ch. 1) in Tx and D3 or D4 (Ch. 2) in Rx | Ch. 1 then Ch. 2 | Ch. 1 = H Ch. 2 = V | +45° | None | 0.125 |
| PC2 | −T | D2 (Ch. 1) in Rx and D3 or D4 (Ch. 2) in Rx | Ch. 2 then Ch. 1 | Ch. 1 = V Ch. 2 = H | −45° | None | 0.125 |
| PC2 | $(t_2-t_1) - T$ | D1 (Ch. 1) in Tx and D3 or D4 (Ch. 2) in Rx | Ch. 1 then Ch. 2 | Ch. 1 = V Ch. 2 = H | +45° | None | 0.125 |
| PC3/PC4 | 0 | D2 (Ch. 1) in Rx | Same Time | Indeterminate | −45° | Binary 1 | 0.25 |

TABLE 3-continued

Determination of a binary one ("1")

| Path Combination | Detection Time Difference | Where Detected | Detection Order | Polarization from ODLT and ODLR | Polarization from PBS3 | Data from Tx to Rx | Probability per Down-Converted pair |
|---|---|---|---|---|---|---|---|
| PC3/PC4 | $t_2-t_1$ | and D3 (Ch. 2) in Rx D1 (Ch. 1) in Tx and D4 (Ch. 2) in Rx | Ch. 1 then Ch. 2 | Indeterminate | +45° | None | 0.25 |

As illustrated in FIGS. 2-8, the optical communication system consists of a source 25, a transmitter 15, and a receiver 20. In one embodiment, the source 25 and receiver 20 are at the same location and may be contained within the same "black box". The transmitter 15 may be located at some distance from the source 25 and receiver 20. The source 25 includes a quasi-monochromatic, continuous wave laser, a non-linear crystal (NLC), a beam stop, and two apertures (A1 and A2). In one embodiment, the non-liner crystal is a Beta Barium Borate (BBO) type. At the present time, BBO is the most efficient nonlinear crystal for parametric down-conversion (size vs. cost vs. down-conversion efficiency). However, other types of nonlinear crystals (KDP, Lithium Niobate, etc.) may be used.

The laser generates a multiplicity of photons, each of which can be considered a "particle of light." Although light propagates as an electromagnetic wave, it can be created or absorbed only in discrete amounts of energy, known as photons. That is, a photon is a discrete quantity of energy that can be thought of as a packet of electromagnetic radiation traveling at the speed of light.

The photons from the continuous wave laser are used as "pump" photons in the non-linear crystal (NLC in FIGS. 2-8). In the NLC, a "pump" photon may be annihilated in a parametric down-conversion event in which a "signal" and "idler" pair of photons is simultaneously created. Because the pump is a continuous wave laser, the down-conversion events occur in the NLC completely at random. That is, spontaneous parametric down-conversion occurs when an incoming photon is annihilated, and a new pair of photons is created within the NLC. The sum of the energies and momenta of the two new photons equal the energy and momentum of the annihilated photon. "Parametric" refers to the state of the non-linear crystal, in that it is left unchanged in the process. The process is "spontaneous" in the same sense as spontaneous emission—it is stimulated by random vacuum fluctuations. Consequently, the photon pairs are created at random times.

The NLC is cut to allow down-conversion via degenerate, non-colinear, type I phase-matching. In Type I phase matching, the pump photon polarization is orthogonal to the signal photon and idler photon polarization. In this case, the pump photons are vertically (V) polarized.

Any signal photons and idler photons that are produced via down-conversion are horizontally (H) polarized. Alternatively, other embodiments of the optical communication system 10 may use type II phase-matching where the polarization of the pump photons and signal photons are orthogonal to the idler photon polarization.

Apertures A1 and A2, as shown in FIGS. 2-8, are placed in the signal and idler outputs and are positioned so as to transmit only those signal and idler pairs in which both photons have the same center frequency and bandwidth. One of the photons of a down-converted pair will pass through aperture A1 and enter channel 1, and the other photon will pass through aperture A2 and enter channel 2. Apertures A1 and A2 are positioned so that both photons of a down-converted pair will exit the apertures simultaneously.

The creation of each signal and idler pair of photons occurs randomly in time. The average rate at which down-converted pairs are emitted from the two apertures in the source 25 is equal to R. The average time interval between the emission of down-converted pairs from the source 25 is equal to 1/R.

Because of the way in which the NLC is cut, the equal frequency (and equal bandwidth) signal and idler photons exit the NLC at equal angles on opposite sides of the pump beam. For convenience, this equal angle is drawn as 45 degrees (as show in FIGS. 2-8), but, in other embodiments, it may have a different value.

The down-converted photons may be redirected by reflection from one or more optical mirrors, after they have passed through the two apertures. This allows the transmitter 15 to be placed in any direction from the source 25 or the receiver 20.

After passing through the NLC, the pump photons that were not annihilated in down-conversion events are discarded into the beam stop (STP in FIGS. 2-8).

The photon of a down-converted pair that exits aperture A1 in the source 25 travels via channel 1 through the optical communication channel 1 to the transmitter 15. The photon of a down-converted pair that exits aperture A2 in the source 25 travels via channel 2 to the receiver 20.

The transmitter 15 contains an input section, a polarization-dependent optical delay line (ODLT in FIGS. 2-8), a polarization detection section, and an output section.

The input section consists of input polarizer (HP1), bandpass filter (F1), and polarization rotator (PR1). Polarizer HP1 is set to transmit incident H polarized photons. Bandpass filter F1 controls the bandwidth of the channel 1 photons used in the optical communication system 10.

Polarization rotator PR1 rotates the polarization direction of an incident H polarized photon to a +45 degree polarization. PR1 allows all of the components of the polarization-dependent optical delay line ODLT to be placed in the same (horizontal) plane.

Polarization-dependent optical delay line ODLT in the transmitter 15 consists of two polarizing beam splitters (PBS1 and PBS2) and two mirrors (m). Both PBS1 and PBS2 are set so that they transmit incident H polarized photons and reflect incident V polarized photons.

As shown in FIGS. 2-8, the polarizing beam splitter PBS1, the first component of ODLT in the transmitter 15, divides the probability amplitude of each incident +45 degree polarized channel 1 photon into equal amplitude H polarized and V polarized components. The H polarized component is transmitted through PBS1 and travels through the short (H) path in ODLT to polarizing beam splitter PBS2. The H polarized component is transmitted through PBS2 and travels to polarizing beam splitter PBS3.

The V polarized component of the probability amplitude of the channel 1 photon is reflected at PBS1 and travels through the long (V) path in ODLT via the two mirrors (m) to polarizing beam splitter PBS2. The V polarized component is reflected by PBS2 and then travels to polarizing beam splitter PBS3.

The optical path length of the short path in polarization-dependent optical delay line ODLT in the transmitter 15 is made as short as is practicable. The time difference between the long and short paths in ODLT in the transmitter 15 is equal to T. This time difference, T, should be much longer than the coherence time width of the signal and idler photons. However, time difference T must be shorter than the coherence time width of the photons of the quasi-monochromatic continuous wave pump laser.

The polarization detection section in the transmitter 15 consists of two polarizing beam splitters (PBS3 and PBS4), two polarization rotators (PR2 and PR3), two mirrors (m), two electro-optic modulators (EOM1 and EOM2), and photon detector D1. Detector D1 along with its associated electronics is capable of photon counting. Photon counting, and the associated electronics are known in the optics art. All of the electro-optic modulators (EOM1 through EOM3) in the optical communication system 10 are optical devices in which a signal-controlled element displaying electro-optic effect is used to modulate a beam of light. The modulation may be imposed on the phase, frequency, amplitude, polarization, or direction of the modulated beam.

Polarizing beam splitter PBS3 is set so that it transmits incident +45 degree polarized photons and reflects incident −45 degree polarized photons. Polarizing beam splitter PBS4 is set so that it transmits incident H polarized photons and reflects incident V polarized photons. Polarization rotators PR2 and PR3 allow all three of the electro-optic modulators in the transmitter 15 to be oriented in H/V polarization bases.

In one embodiment, the three electro-optic modulators (EOM1, EOM2, and EOM3) in the transmitter 15 are substantially identical. In one embodiment, each of the three electro-optic modulators is a Pockels cell type modulator. An electro-optic modulator (EOM) can be used to rotate the polarization direction of a photon that passes through the EOM.

An EOM is turned off by applying 0 Volts to the EOM control input. If the EOM is "off", then the polarization direction of a photon that passes through the EOM will not be changed. An EOM is turned on by applying a voltage equal to $V_\pi$ to the EOM control input. If the EOM is "on", then it functions as a half-wave plate. The polarization direction of a photon that passes through the EOM will be rotated by 90 degrees. The electro-optic modulators (EOM1-EOM3) in the Transmitter 15 can be switched "on" or "off" in a time that is smaller than the average time between the emission of downconverted photon pairs from the source 25 (1/R).

The first component of the polarization detection section, PBS3, divides the probability amplitude of each incident photon into equal amplitude +45 degree polarized and −45 degree polarized components. The +45 degree polarized component is transmitted through PBS3 and travels in the "+45 degree channel" to polarization rotator PR2. As it passes through PR2, the polarization direction of the component is rotated from +45 degree polarized to V polarized. The now V polarized component travels via mirror m to electro-optic modulator EOM1.

If EOM1 is "off", the V polarized component passes through EOM1 unchanged and travels to PBS4. The V polarized component is reflected by PBS4 and travels to EOM3. If EOM1 is "on", the polarization direction of the component is rotated as it passes through EOM1 from V polarized to H polarized. The now H polarized component in the "+45 degree channel" travels to PBS4. The H polarized component is transmitted through PBS4 and is incident on detector D1 in the transmitter 15.

The −45 degree polarized component of the probability amplitude of the channel 1 photon is reflected at PBS3 and travels in the "−45 degree channel" to polarization rotator PR3. As it passes through PR3, the polarization direction of the component is rotated from −45 degree polarized to H polarized. The now H polarized component travels via mirror m to electro-optic modulator EOM2. If EOM2 is "off", the H polarized component passes through EOM2 unchanged and travels to PBS4. The H polarized component is transmitted through PBS4 and travels to EOM3. If EOM2 is "on", the polarization direction of the component is rotated as it passes through EOM2 from H polarized to V polarized. The now V polarized component in the "−45 degree channel" travels to PBS4. The V polarized component is reflected by PBS4 and is incident on detector D1 in the transmitter 15.

The output section of the transmitter 15 consists of an electro-optic modulator (EOM3), an output polarizer (HP2), and a directing mirror, dm as shown in FIGS. 2-8. The function of the output section is to insure that, regardless of whether a binary zero or a binary one message is being sent, every photon that exits the transmitter 15 will be H polarized.

If the transmitter 15 is sending a binary zero message, then EOM1 will be "off" and both EOM2 and EOM3 will be "on". In this binary zero case, the only probability amplitude component that can reach EOM3 is the V polarized component that passed through the +45 degree channel in the polarization detection section. Since EOM3 is "on", as the V polarized component passes through EOM3, its polarization direction is rotated to H polarized. The now H polarized component travels to output polarizer HP2. The H polarized component is transmitted through HP2 and exits the transmitter 15 via directing mirror dm. The H polarized component then travels through the optical communication channel 1 to the receiver 20.

If the transmitter 15 is sending a binary one message, then EOM1 will be "on" and both EOM2, and EOM3 will be "off". In this binary one case, the only probability amplitude component that can reach EOM3 is the H polarized component that passed through the −45 degree channel in the polarization detection section. Since EOM3 is "off", the H polarized component passes through EOM3 unchanged and travels to output polarizer HP2. The H polarized component is transmitted through HP2 and exits the transmitter 15 via directing mirror dm. The H polarized component then travels through the optical communication channel 1 to the receiver 20.

As shown in FIGS. 2-8, the receiver 20 receives photons through a fixed-length optical delay line (FODL), and includes an input section, a polarization-dependent optical delay line (ODLR), and two polarization detection sections. Fixed-length optical delay line FODL may be a spool of polarization-preserving optical fiber, or it may be a free space path between optical mirrors. In addition, the channel 1 and channel 2 communication pathways between the transmitter 15, receiver 20 and source 25 may be free space paths, polarization-preserving optical fiber, or some combination of the two.

The input section consists of input polarizer (HP4), bandpass filter (F2), and polarization rotator (PR4). Polarizer HP4 is set to transmit incident H polarized photons. Bandpass filter F2 controls the bandwidth of the channel 2 photons used in the system. Polarization rotator PR4 rotates the polarization direction of an incident H polarized photon to +45 degree polarization. PR4 allows all of the components of polarization-dependent optical delay line ODLR to be placed in the same (horizontal) plane.

In one embodiment, the polarization-dependent optical delay line in the receiver 20 (ODLR) is substantially identical to polarization-dependent optical delay line in the transmitter 15 (ODLT). ODLR in the receiver 20 consists of two polarizing beam splitters (PBS5 and PBS6) and two mirrors (m). Both PBS5 and PBS6 are set so that they transmit incident H polarized photons and reflect incident V polarized photons.

The optical path length of the short (H) path through ODLR in the receiver 20 is equal to the optical path length of the short (H) path through ODLT in the transmitter 15. Also, the optical path length of the long (V) path through ODLR in the receiver 20 is equal to the optical path length of the long (V) path through ODLT in the transmitter 15. The time difference between the long path and the short path through ODLR in the receiver 20 is equal to T. This is the same time difference as between the long and short optical paths in ODLT in the transmitter 15.

The first polarization detection section in the receiver 20 consists of polarizer HP3 and detector D2. Polarizer HP3 is set to transmit incident H polarized channel 1 photons to detector D2. Detector D2 along with its associated electronics is capable of photon counting. The second polarization detection section consists of polarizing beam splitter PBS7 and photon detectors D3 and D4. PBS7 is set to reflect incident −45 degree polarized channel 2 photons to detector D3 and to transmit incident +45 degree polarized photons to detector D4. Detectors D3 and D4 along with their associated electronics are capable of photon counting.

Any channel 1 photon that exits the transmitter 15 travels through the optical communication channel 1 to the receiver 20 and is incident on polarizer HP3. Polarizer HP3 is set to transmit photons that are H polarized. Because all of the photons that exit the transmitter 15 should be H polarized, HP3 is used to improve the signal to noise ratio of the system by blocking randomly polarized noise photons that may enter the receiver 20 from the surrounding environment.

Channel 2 photons from aperture A2 in the source 25 enter fixed-length optical delay line FODL in the receiver 20. After a channel 2 photon has passed through FODL, it travels to input polarizer HP4. HP4 is set to transmit the H polarized channel 2 photon to bandpass filter F2. After passing through F2, the channel 2 photon travels to polarization rotator PR4. PR4 rotates the polarization direction of each channel 2 photon from H polarized to +45 degree polarized. After passing through PR4, the channel 2 photon is incident on polarizing beam splitter PBS5, the first component of polarization-dependent optical delay line ODLR in the receiver 20.

After passing through ODLR, the channel 2 photon travels to polarizing beam splitter PBS7 in the receiver 20. PBS7 is set to reflect incident −45 degree polarized photons to detector D3 and to transmit incident +45 degree polarized photons to detector D4.

The receiver 20 also contains coincidence counting electronics (not shown in FIGS. 2-8). These electronics allow registration of two-photon coincidence detection events that occur in the receiver 20 between the channel 1 photon in detector D2 and the channel 2 photon either in detector D3 or in detector D4. The coincidence detection is determined by setting the time duration of a coincidence "time window" within the coincidence counting electronics. Coincidence counting electronics are well known in the optical arts.

In one embodiment, the optical communication system 10 has certain path length requirements for optimum operation. As previously stated, the two polarization-dependent optical delay lines (ODLT and ODLR) in the optical communication system 10 should be identical. The optical path length of the short (H) path through ODLT in the transmitter 15 should be equal to the optical path length of the short (H) path through ODLR in the receiver 20. Also, the optical path length of the long (V) path through ODLT in the transmitter 15 should be equal to the optical path length of the long (V) path through ODLR in the receiver 20.

The time difference between the long and short paths in ODLT (and ODLR) is equal to T. This time difference, T, must be shorter than the coherence time width of the photons of the quasi-monochromatic continuous wave pump laser (~30 nanoseconds). In one embodiment, the time difference between the long and short paths in ODLT should be set so that T obeys the following equations 1 and 2:

$$\omega_P \cdot T = (2 \cdot \pi \cdot n) + \pi \text{ (n is an integer)} \qquad \text{Equation 1}$$

$$\omega_S \cdot T = (\pi \cdot n) + (\pi/2) \text{ } (\omega_S = \omega_P/2) \qquad \text{Equation 2}$$

In the above equations 1 and 2, $\omega_P$ is the center (radial) frequency of a pump photon, and $\omega_S$ is the center (radial) frequency of a signal (or idler) photon. The time difference, T, should be longer than the coherence time width of the signal and idler photons (~100 femtoseconds). Also, the time difference, T, should be longer than the "time window" of the coincidence counting electronics in the receiver 20 (~1 nanosecond to 3 nanoseconds).

If a quasi-monochromatic photon with frequency equal to $\omega_S$ is sent into the transmitter 15, ODLT and PBS3 in the transmitter 15 should be set so that the photon has an equal probability of either being transmitted through PBS3 into the "+45 degree channel" or of being reflected by PBS3 into the "−45 degree channel" of the polarization detection section in the transmitter 15.

The optical path lengths through the polarization detection section in the transmitter 15 should be set so that a channel 1 photon will travel from PBS3 to HP2 in the same amount of time and will exit HP2 with the same phase, regardless of whether the photon travels through the "+45 degree channel" or the "−45 degree channel".

The optical path lengths through the system should be set so that, if the channel 1 photon of a down-converted pair passes through the short (H) path in ODLT in the transmitter 15, and the channel 2 photon of the pair passes through the short (H) path in ODLR in the receiver 20, and both photons are detected in the receiver 20, then the two photons will be detected within the same "time window" of the coincidence counting electronics in the receiver 20.

To send information from the transmitter 15 to the receiver 20, the transmitter 15 will either turn off the electro-optic modulator EOM1 and turn on both EOM2 and EOM3 in the transmitter 15 for a specified amount of time (binary zero), or the transmitter 15 will turn on EOM1 and turn off both EOM2 and EOM3 for a specified amount of time (binary one).

To determine whether a binary zero message or a binary one message is being sent, the receiver 20 records the number of photons that are detected in two-photon coincidence events either in detectors D2 and D3 (binary zero), or in detectors D2 and D4 (binary one). Using this two-photon coincidence detection information, the receiver 20 will be able to determine whether a binary zero or a binary one message is being sent by the transmitter 15.

The number of photons required to send a binary message from the transmitter 15 to the receiver 20 will depend on the specifics of the communications channel and the equipment used in the system. A number of down-converted photon pairs travel through the system and are detected at the receiver 20, thus allowing a statistically accurate conclusion to be reached as to which binary message is being sent. This number will depend on channel/system noise and detector quantum efficiency, as well as other factors.

To send a binary zero message from the transmitter 15 to the receiver 20, the transmitter 15 turns off electro-optic modulator EOM1 and turns on electro-optic modulators EOM2 and EOM3. EOM1 is kept turned off and EOM2 and EOM3 are kept turned on throughout the time required to send a binary zero message.

The H polarized photon of a down-converted pair that exits aperture A1 in the source 25 travels through the optical communications channel 1 to the transmitter 15 and is incident on polarizer HP1, the first component of the transmitter 15. HP1 is set to transmit incident H polarized photons. After the H polarized channel 1 photon is transmitted through HP1, it passes through bandpass filter F1 and then travels to polarization rotator PR1. As it passes through PR1, the polarization direction of the channel 1 photon is rotated from H polarized to +45 degree polarized.

After exiting PR1, the now +45 degree polarized channel 1 photon is incident on polarizing beam splitter PBS1, the first component of polarization-dependent optical delay line ODLT in the transmitter 15. PBS1 divides the probability amplitude of each incident +45 degree polarized channel 1 photon into equal amplitude H polarized and V polarized components. The H polarized component enters the short (H) path in ODLT, and the V polarized component enters the long (V) path in ODLT. The H polarized component of the probability amplitude of the channel 1 photon travels through the short path in ODLT to polarizing beam splitter PBS2. The H polarized component is transmitted through PBS2 and travels to polarizing beam splitter PBS3.

The V polarized component of the probability amplitude of the channel 1 photon travels through the long path in ODLT via two mirrors (m) to polarizing beam splitter PBS2. The V polarized component is reflected by PBS2 and then travels to polarizing beam splitter PBS3. PBS3, the first component of the polarization detection section in the transmitter 15, is set to reflect incident −45 degree polarized photons into the "−45 degree channel" and to transmit incident +45 degree polarized photons into the "+45 degree channel".

After passing through ODLT, the probability that a channel 1 photon will be reflected by PBS3 into the "−45 degree channel" and will be incident on polarization rotator PR3 is equal to 0.5. If a channel 1 photon is in fact incident on polarization rotator PR3 in the transmitter 15, then the photon must be −45 degree polarized. The polarization direction of the −45 degree polarized photon is rotated to H polarized as it passes through PR3. The now H polarized photon travels via mirror m to electro-optic modulator EOM2. In the binary zero case, EOM2 is "on". Consequently, the polarization direction of the photon is rotated as it passes through EOM2 from H polarized to V polarized. The now V polarized photon travels to PBS4. The V polarized photon is reflected by PBS4 and is incident on detector D1 in the transmitter 15.

After passing through ODLT, the probability that a channel 1 photon will be transmitted through PBS3 into the "+45 degree channel" and will be incident on polarization rotator PR2 is also equal to 0.5. If a channel 1 photon is in fact incident on polarization rotator PR2 in the transmitter 15, then the photon must be +45 degree polarized. The polarization direction of the +45 degree polarized photon is rotated to V polarized as it passes through PR2. The now V polarized photon travels via mirror m to electro-optic modulator EOM1. In the binary zero case, EOM1 is "off". Consequently, the V polarized photon passes through EOM1 unchanged and travels to PBS4. The V polarized photon is reflected by PBS4 and travels to EOM3. In the binary zero case, EOM3 is "on".

In the binary zero case, only a V polarized photon that passed through the +45 degree channel can reach EOM3. Since EOM3 is "on", as the V polarized photon passes through EOM3, its polarization direction is rotated to H polarized. The now H polarized photon travels to output polarizer HP2. The H polarized photon is transmitted through HP2 and exits the transmitter 15 via directing mirror dm. The H polarized photon then travels through the optical communication channel 1 to the receiver 20. When it reaches the receiver 20, the H polarized photon is transmitted through HP3 and is incident on detector D2 in the receiver 20.

In the binary zero case, if a channel 1 photon is detected in detector D1 in the transmitter 15, then the photon must have been −45 degree polarized when it exited PBS3 in the transmitter 15. In the binary zero case, if a channel 1 photon is detected in detector D2 in the receiver 20, then the photon must have been +45 degree polarized when it exited PBS3 in the transmitter 15.

The H polarized photon of a down-converted pair that exits aperture A2 in the source 25 and travels in channel 2 to ° the receiver 20 enters optical delay line FODL. After passing through FODL, the H polarized channel 2 photon is incident on polarizer HP4. HP4 is set to transmit incident H polarized photons. After the H polarized channel 2 photon is transmitted through HP4, it passes through bandpass filter F2 and then travels to polarization rotator PR4. As it passes through PR4, the polarization direction of the channel 2 photon is rotated from H polarized to +45 degree polarized. After exiting PR4, the now +45 degree polarized channel 2 photon is incident on polarizing beam splitter PBS5, the first component of polarization-dependent optical delay line ODLR in the receiver 20.

PBS5 divides the probability amplitude of each incident channel 2 photon into equal amplitude H polarized and V polarized components. The H polarized component enters the short (H) path in ODLR, and the V polarized component enters the long (V) path in ODLR. The H polarized component of the probability amplitude of the channel 2 photon travels through the short path in ODLR to polarizing beam splitter PBS6. The H polarized component is transmitted through PBS6 and travels to polarizing beam splitter PBS7.

The V polarized component of the probability amplitude of the channel 2 photon travels through the long path in ODLR via two mirrors (m) to polarizing beam splitter PBS6. The V polarized component is reflected by PBS6 and then travels to PBS7. Polarizing beam splitter PBS7 is set to reflect incident −45 degree polarized photons to detector D3 and to transmit incident +45 degree polarized photons to detector D4. If a channel 2 photon is detected in detector D3 in the receiver 20, then that photon must be −45 degree polarized. If a channel 2 photon is detected in detector D4 in the receiver 20, then that photon must be +45 degree polarized.

In the following description, it is assumed that if the channel 1 photon takes the short (H) path through polarization-dependent optical delay line ODLT in the transmitter 15, then the time required for the channel 1 photon to travel from aperture A1 in the source 25 to detector D1 in the transmitter 15 is equal to $t_1$.

If the channel 1 photon takes the long (V) path through ODLT in the transmitter 15, then the time required for the channel 1 photon to travel from aperture A1 in the source 25 to detector D1 in the transmitter 15 is equal to $(t_1+T)$. The time difference between the long path and the short path through ODLT in the transmitter 15 is equal to T.

It is further assumed that if the channel 1 photon takes the short (H) path through ODLT in the Transmitter 15, then the time required for the channel 1 photon to travel from aperture A1 in the Source 25 to detector D2 in the receiver 20 is equal to $t_2$. If the channel 1 photon takes the long (V) path through ODLT in the transmitter 15, then the time required for the channel 1 photon to travel from aperture A1 in the source 25 to detector D2 in the receiver 20 is equal to $(t_2+T)$. Note that $t_2 > t_1$, and $t_2, t_1 \gg T$.

If the channel 2 photon takes the short (H) path through polarization-dependent optical delay line ODLR in the receiver 20, then the optical path lengths through the system are set so that the time required for the channel 2 photon to travel from aperture A2 in the source 25 to either detector D3 or detector D4 in the receiver 20 is also equal to $t_2$.

If the channel 2 photon takes the long (V) path through ODLR in the receiver 20, then the time required for the channel 2 photon to travel from aperture A2 in the source 25 to either detector D3 or detector D4 in the receiver 20 is equal to $(t_2+T)$. The time difference between the long path and the short path through ODLR in the receiver 20 is equal to T.

As shown in FIGS. 2-8, each pair of down-converted photons may take any one of four different "path combinations" through the system. Any given pair of down-converted photons is equally likely to take any one of the four different path combinations at random.

Figure 3:
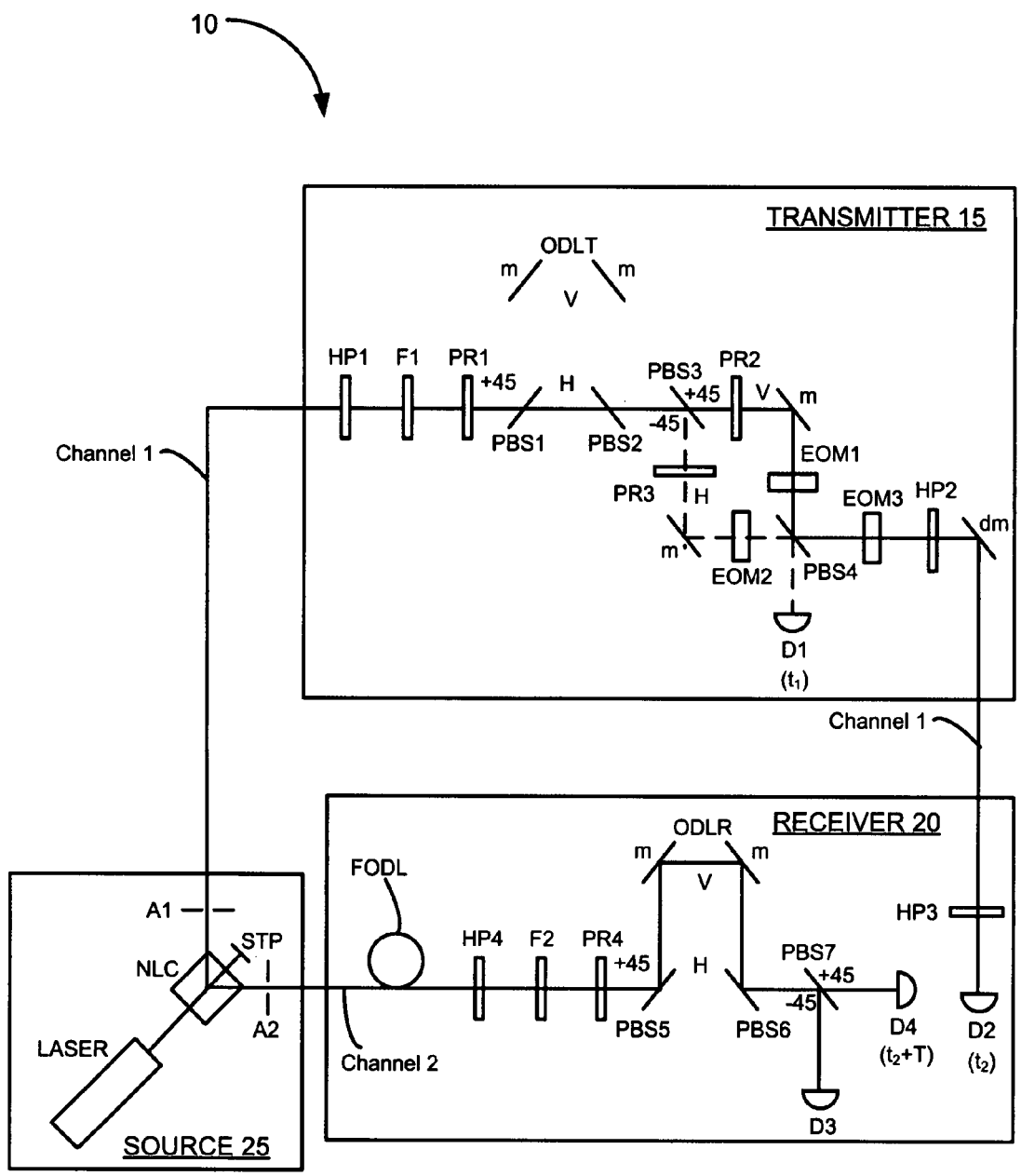
FIG. 3 is a schematic of the embodiment of the optical communication system illustrated in FIG. 2, showing a first path combination for a photon pair when a binary zero is sent.

As shown in FIG. 3, path combination one (PC1) occurs when the photon in channel 1 passes through the short (H) path in ODLT in the transmitter 15, and its partner photon in channel 2 passes through the long (V) path in ODLR in the receiver 20. PC1 is shown in FIG. 3 for the binary zero case. For PC1, if both photons of a down-converted pair are detected in the receiver 20, then the channel 1 photon is detected in detector D2 and the channel 2 photon is detected in either detector D3 or detector D4. The channel 1 photon will be detected before the channel 2 photon is detected, and the time difference (Δ) between these two detections is shown by Equation 3:

$$\Delta = (t_2+T) - t_2 = +T \qquad \text{Equation 3}$$

Note that the positive sign in the above result indicates that, if both photons are detected in the receiver 20, the channel 1 photon is detected before the channel 2 is detected. Also note that T is longer than the time duration of the "time window" of the coincidence counting electronics in the receiver.

For PC1, if the channel 1 photon is detected in detector D1 in the transmitter 15 and channel 2 photon is detected in either detector D3 or detector D4 in the receiver 20, then the time difference (Δ) between these two detections is shown by Equation 4:

$$\Delta = (t_2+T) - t_1 = (t_2-t_1) + T \qquad \text{Equation 4}$$

Figure 4:
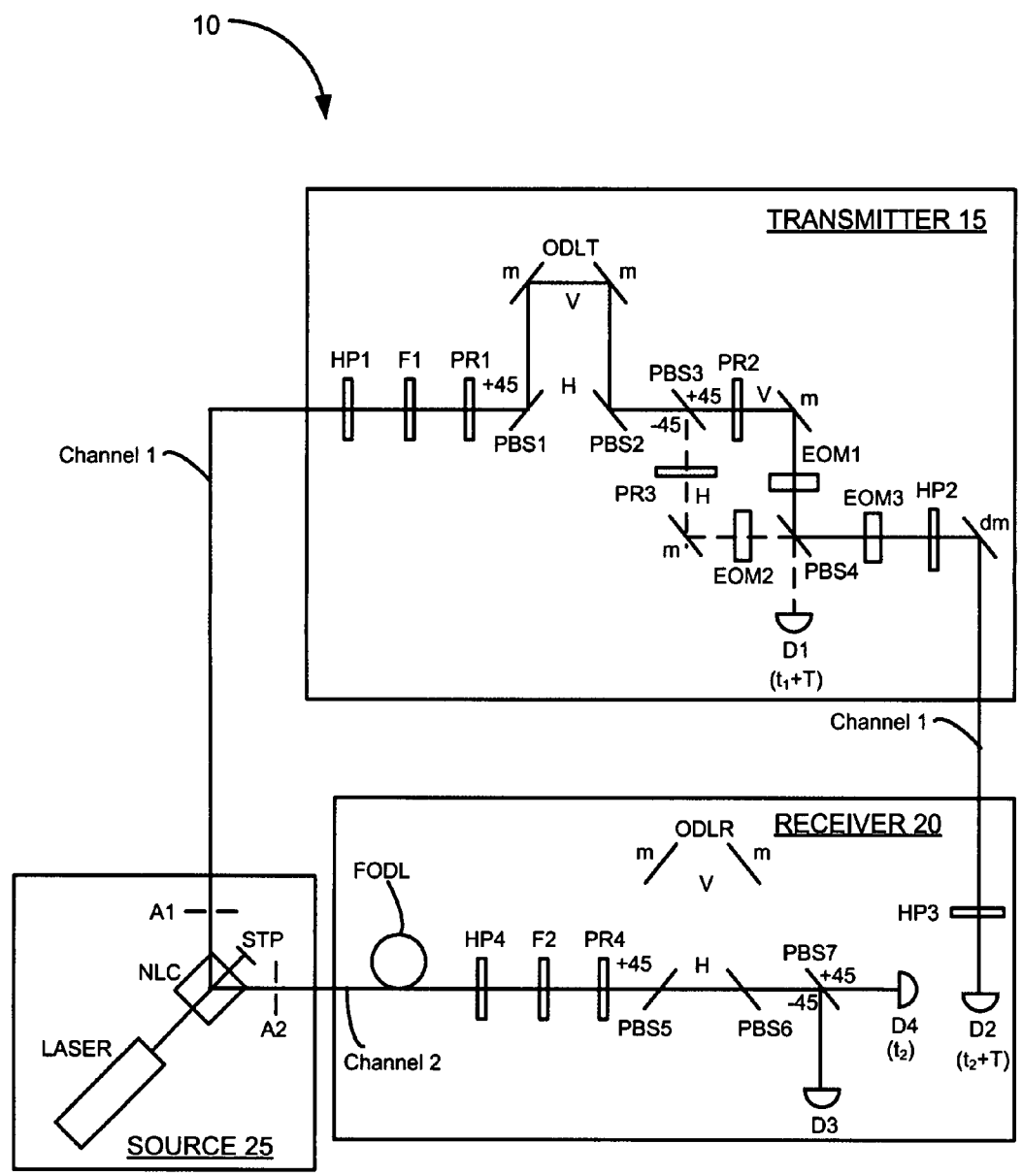
FIG. 4 is a schematic of the embodiment of the optical communication system illustrated in FIG. 2, showing a second path combination for a photon pair.

As shown in FIG. 4, path combination two (PC2) occurs when the photon in channel 1 passes through the long (V) path in ODLT in the transmitter 15, and its partner photon in channel 2 passes through the short (H) path in ODLR in the receiver 20. PC2 is shown in FIG. 4 for the binary zero case. For PC2, if both photons of a down-converted pair are detected in the receiver 20, then the channel 1 photon is detected in detector D2 and the channel 2 photon is detected in either detector D3 or detector D4. In the PC2 case, the channel 1 photon will be detected after the channel 2 photon is detected, and the time difference (Δ) between these two detections is shown by Equation 5:

$$\Delta = t_2 - (t_2+1) = -T \qquad \text{Equation 5}$$

The negative sign in the above result indicates that, if both photons are detected in the receiver 20, the channel 1 photon is detected after the channel 2 is detected. Thus, for this case, the time order of detections for PC2 is the reverse of the time order of detections for PC1.

For PC2, if the channel 1 photon is detected in detector D1 in the transmitter 15 and channel 2 photon is detected in either detector D3 or detector D4 in the receiver 20, then the time difference (Δ) between these two detections is shown by Equation 6:

$$\Delta = t_2 - (t_1+T) = (t_2-t_1) - T \qquad \text{Equation 6}$$

Figure 5:
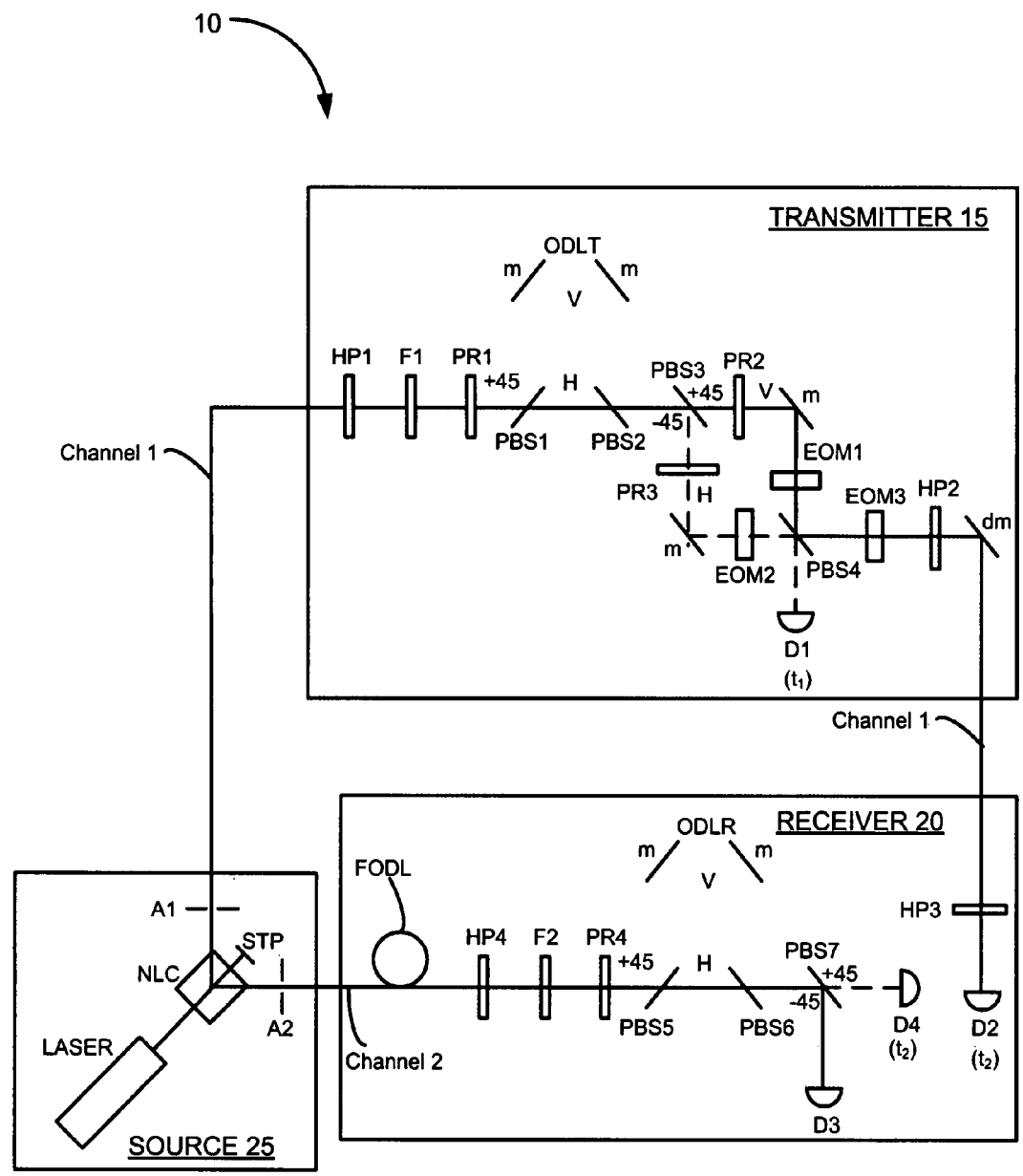
FIG. 5 is a schematic of the embodiment of the optical communication system illustrated in FIG. 2, showing a third path combination for a photon pair.

As shown in FIG. 5, path combination three (PC3) occurs when the photon in channel 1 passes through the short (H) path in ODLT in the transmitter 15, and the photon in channel 2 passes through the short (H) path in ODLR in the receiver 20. PC3 is shown in FIG. 5 for the binary zero case. For PC3, if both photons of a down-converted pair are detected in the receiver 20, then the channel 1 photon and the channel 2 photon will be detected within the same coincidence "time window". The time difference (Δ) between the detections of the two photons is shown by Equation 7:

$$\Delta = t_2 - t_2 = 0 \qquad \text{Equation 7}$$

For PC3, if the channel 1 photon is detected in detector D1 in the transmitter 15 and channel 2 photon is detected in the receiver 20, then the time difference between these two detections is shown by Equation 8:

$$\Delta = t_2 - t_1 = (t_2 - t_1) \qquad \text{Equation 8}$$

Figure 6:
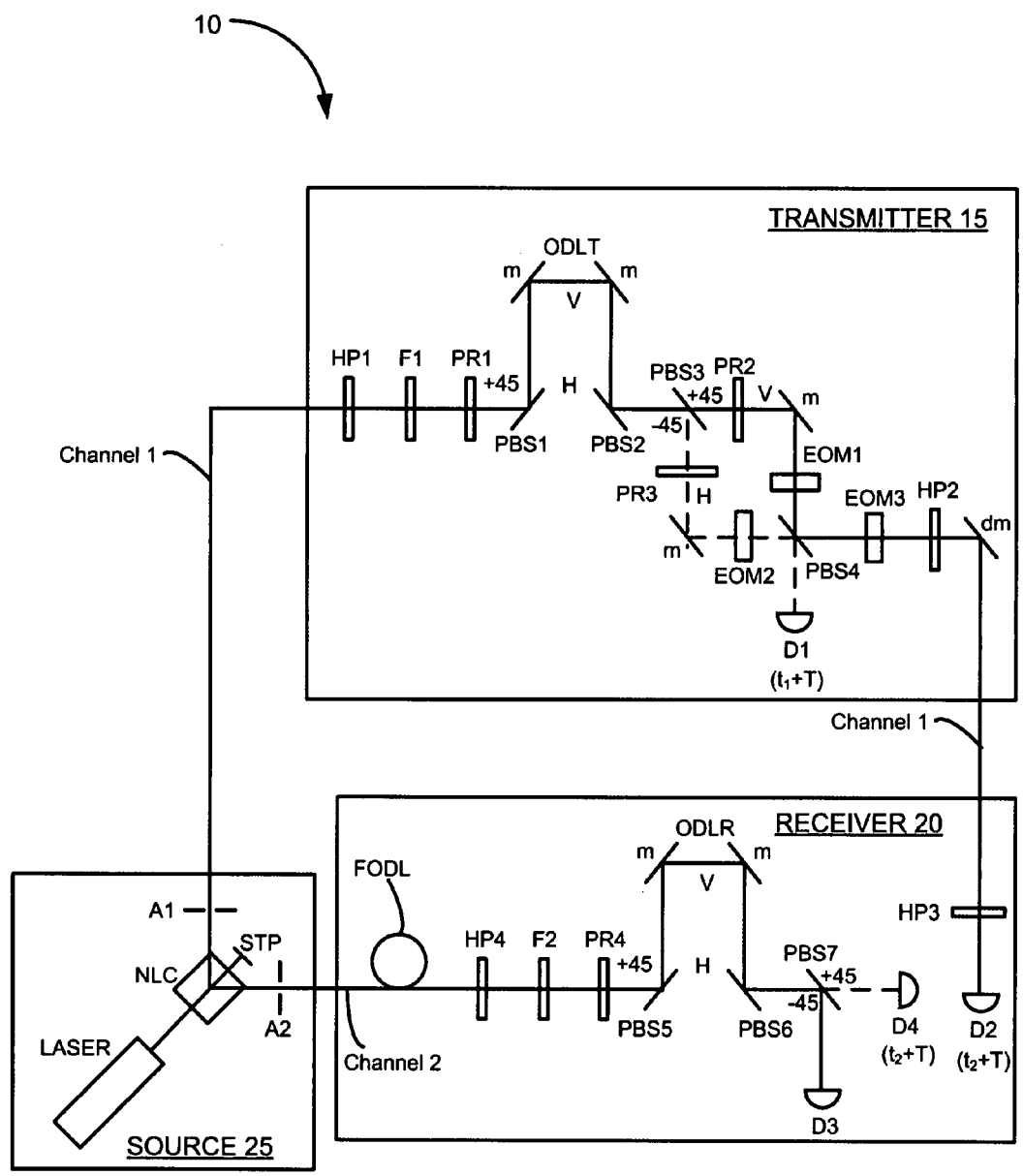
FIG. 6 is a schematic of the embodiment of the optical communication system illustrated in FIG. 2, showing a fourth path combination for a photon pair.

As shown in FIG. 6, path combination four (PC4) occurs when the photon in channel 1 passes through the long (V) path in ODLT in the transmitter 15, and the photon in channel 2 passes through the long (V) path in ODLR in the receiver 20. PC4 is shown in FIG. 6 for the binary zero case. For PC4, if both photons of a down-converted pair are detected in the receiver 20, then the channel 1 photon and the channel 2 photon will be detected within the same coincidence "time window". The time difference (Δ) between the detections of the two photons is shown in Equation 9:

$$\Delta = (t_2+T) - (t_2+T) = 0 \qquad \text{Equation 9}$$

For PC4, if the channel 1 photon is detected in detector D1 in the transmitter 15 and channel 2 photon is detected in the receiver 20, then the time difference (Δ) between these two detections is shown in Equation 10:

$$\Delta = (t_2+T) - (t_1+T) = (t_2-t_1) \qquad \text{Equation 10}$$

Path combination one (PC1) can be uniquely identified by time of detection measurements. The time order and time difference of the detections of the channel 1 and channel 2 photons for PC1 are different from those of any of the other three path combinations. For PC1, there is no uncertainty as to which path the photons of the down-converted pair take through the system or as to the polarization direction of either photon.

To obtain the time of detection differences between the channel 1 and channel 2 photons that are characteristic of PC1, the channel 1 photon must take the short (H) path through ODLT in the transmitter 15, and the channel 2 photon must take the long (V) path through ODLR in the receiver 20. Therefore, regardless of whether the channel 1 photon is ultimately detected in detector D1 in the transmitter 15 or in detector D2 in the receiver 20, the channel 1 photon must be H polarized when it reaches PBS3 in the transmitter 15. Regardless of whether the channel 2 photon is detected in detector D3 or in detector D4, the channel 2 photon must be V polarized when it reaches PBS7 in the receiver 20.

Path combination one (PC1) cannot be used to send data from the transmitter to the receiver, because the channel 2 photons are detected randomly either in detector D3 or in detector D4. Any given channel 2 photon is equally likely to be detected in detector D3 as in detector D4, because the channel 2 photon is V polarized when it reaches PBS7.

Also from the above description, path combination two (PC2) can be uniquely identified by time of detection measurements. The time order and time difference of the detections of the channel 1 and channel 2 photons for PC2 are different from those of any of the other three path combinations. For PC2, there is no uncertainty as to which path the photons of the down-converted pair take through the system or as to the polarization direction of either photon.

To obtain the time of detection differences between the channel 1 and channel 2 photons that are characteristic of PC2, the channel 1 photon must take the long (V) path through ODLT in the transmitter 15, and the channel 2 photon must take the short (H) path through ODLR in the receiver 20. Therefore, regardless of whether the channel 1 photon is ultimately detected in detector D1 in the transmitter 15 or in detector D2 in the receiver 20, the channel 1 photon must be V polarized when it reaches PBS3 in the transmitter 15. Regardless of whether the channel 2 photon is detected in detector D3 or in detector D4, the channel 2 photon must be H polarized when it reaches PBS7 in the receiver 20.

Path combination two (PC2) cannot be used to send data from the transmitter to the receiver, because the channel 2 photons are detected randomly either in detector D3 or in detector D4. Any given channel 2 photon is equally likely to be detected in detector D3 as in detector D4, because the channel 2 photon is H polarized when it reaches PBS7.

For both PC1 and PC2, the path information for both photons of each down-converted pair can be determined by comparing time of detection measurements of the channel 1 and channel 2 photons. The polarization directions of both photons of each down-converted pair can also be determined in this way. PC1 and PC2 are distinct, and there is no indeterminacy in their individual identification. Even in those cases when both photons of a down-converted pair are detected in the receiver 20, the channel 1 and channel 2 photon detections are separated in time by T. The path lengths through ODLT and ODLR are set so that T is greater than the time width of the "time window" of the coincidence counting electronics in the receiver 20. Consequently, neither PC1 nor PC2 can yield a two-photon coincidence detection event in the receiver 20. This allows the receiver to ignore PC1 and PC2.

Another embodiment of the optical communication system 10 may reduce the path length difference between the long and short paths through the two polarization-dependent optical delay lines so that the value of T becomes less than the width of the "time window" of the coincidence counting circuitry. This alternative may provide greater mechanical stability for the optical communication system 10. However, communication would then become probabilistic. In the binary zero case, 0.75 of the coincident detections would be of the D2/D3 type, and 0.25 of the coincident detections would be of the D2/D4 type. In the binary one case, 0.75 of the coincident detections would be of the D2/D4 type, and 0.25 of the coincident detections would be of the D2/D3 type.

Path combination three (PC3) and path combination four (PC4) may be distinguished from either path combination one or path combination two by using time of detection measurements. However, both the time order and time difference of the detections of the channel 1 and channel 2 photons for PC3 are exactly the same as those for PC4. Therefore, time of detection measurements cannot be used to distinguish PC3 from PC4. The only way that PC3 can be distinguished from PC4 is if either the channel 1 photon is detected at the output of ODLT using an H/V polarization basis, or the channel 2 photon is detected at the output of ODLR using an H/V polarization basis.

Consequently, if both photons of a down-converted pair are detected or analyzed in +45/−45 degree polarization bases, and the detections have the time difference and time order characteristic of PC3 (and PC4), then the paths that the channel 1 photon took through ODLT in the transmitter 15 and the channel 2 photon took through ODLR in the receiver 20 are indeterminate.

Once both photons of a down-converted pair have been detected or analyzed in +45/−45 degree polarization bases, it is not possible, even in principle, to determine whether the two photons traveled through the system via PC3 or via PC4. The path information for this down-converted pair of photons has been erased. In this indeterminate, PC3/PC4 case, either both photons travel through the short paths in ODLT and ODLR, or both photons travel through the long paths in ODLT and ODLR. The time difference between the long path and the short path in both ODLT in the transmitter 15 and ODLR in the receiver 20 is equal to T. This time value (T) is less than the time width of the photons of the quasi-monochromatic continuous wave pump laser, but is greater than the time width of the signal and idler photons.

In the PC3/PC4 case, the time at which any given pair of down-converted photons is created in the NLC in the source 25 is uncertain. This uncertainty in the creation time of a signal and idler pair of photons is approximately equal to the time width of the photons of the continuous wave pump laser. The uncertainty in the time of creation of a pair of down-converted photons allows "fourth-order" interference to occur between two "virtual" down-converted pairs that are created at different times by the annihilation of the same pump photon. The first virtual down-converted pair ($V_1 V_2$) is created at time t and travels via PC4. The second virtual down-converted pair ($H_1 H_2$) is created at time (t+T) and travels via PC3. The phase difference ($\Phi$) between the two virtual down-converted pairs in the fourth-order interference is shown by Equation 11:

$$\Phi = (\omega_P \cdot T) + \theta = (2 \cdot \omega_S \cdot T) + \theta \qquad \text{Equation 11}$$

In the above equation, $\omega_P$ is the (radial) frequency of the pump photon, $\omega_S$ is the (radial) frequency of the signal (or idler) photon, and $\theta$ is any additional phase difference that is introduced in ODLT in the transmitter 15 between the H polarized and V polarized components of the probability amplitude of the channel 1 photon. In this system $\theta = 0$.

As previously stated, in this embodiment, the optical path length differences between the long and short paths through both ODLT and ODLR are set (as shown in Equation 12) so that:

$$\omega_P \cdot T = (2 \cdot \pi \cdot n) + \pi \text{ (n is an integer)} \qquad \text{Equation 12}$$

Thus, the effective phase difference is $\Phi=\pi$. Due to the "fourth-order" interference in the PC3/PC4 case, the quantum state of the channel 1 photon at the output of ODLT and the channel 2 photon at the output of ODLR is shown in Equation 13:

$$(H_1H_2+e^{i\Phi}V_1V_2)/\sqrt{2}=(H_1H_2-V_1V_2)/\sqrt{2} \text{ (since } e^{i\pi}=-1)$$ Equation 13

In the above, the $H_1$ represents a horizontally-polarized photon in channel 1 at the output of ODLT. The $H_2$ represents a horizontally-polarized photon in channel 2 at the output of ODLR. The $V_1$ represents a vertically-polarized photon in channel 1 at the output of ODLT. The $V_2$ represents a vertically-polarized photon in channel 2 at the output of ODLR.

The quantum state shown in Equation 13 is the "Bell Phi Minus" quantum-entangled state. In different embodiments, other quantum-entangled states could also be used by appropriately setting the optical path length differences through ODLT and ODLR.

In the +45/−45 degree polarization basis in which the channel 1 and channel 2 photons are both analyzed, this quantum-entangled state is shown in Equation 14:

$$[(+45)_1(-45)_2+(-45)_1(+45)_2]/\sqrt{2}$$ Equation 14

In the above, the $(+45)_1$ represents a +45 degree polarized photon in channel 1 at PBS3 in the transmitter. The $(-45)_2$ represents a −45 degree polarized photon in channel 2 at PBS7 in the receiver. The $(-45)_1$ represents a −45 degree polarized photon in channel 1 at PBS3 in the transmitter. The $(+45)_2$ represents a +45 degree polarized photon in channel 2 at PBS7 in the receiver. This quantum-entangled state shows that if the channel 1 photon is +45 degree polarized at PBS3 in the transmitter then the channel 2 photon will be −45 degree polarized when it reaches PBS7 in the receiver, or that if the channel 1 photon is −45 degree polarized at PBS3 in the transmitter then the channel 2 photon will be +45 degree polarized when it reaches PBS7 in the receiver.

Note that this quantum-entangled state is known to have existed only after both photons of a down-converted pair are analyzed in +45/−45 degree polarization bases, and the photon detections exhibit the characteristic time order and time difference of PC3/PC4.

The "fourth-order" interference causes the quantum-entangled state to exist despite the fact that the channel 1 photon passes through ODLT and has its polarization direction "measured" by the polarization detection section in the transmitter 15, even before the channel 2 photon reaches ODLR in the receiver 20.

In the PC3/PC4 case for a binary zero, if the channel 1 photon of a down-converted pair is detected in detector D1 in the transmitter 15, then this photon must have traveled through the −45 degree channel in the polarization detection section in the transmitter 15. Therefore, this channel 1 photon must have been −45 degree polarized when it exited PBS3 in the transmitter 15. This means that the quantum-entangled state "collapsed" to the state $[(-45)_1 (+45)_2]$. Consequently, if its partner photon is detected in the receiver 20, then this channel 2 photon will be detected in the "+45 degree detector", D4. Because the channel 1 photon is incident on detector D1 in the transmitter 15, this case cannot produce a two-photon coincidence detection event in the receiver 20.

In the PC3/PC4 case for a binary zero, if the channel 1 photon of a down-converted pair is detected in detector D2 in the receiver 20, then this photon must have traveled through the +45 degree channel in the polarization detection section in the transmitter 15. Therefore, this channel 1 photon must have been +45 degree polarized when it exited PBS3 in the transmitter 15. This means that the quantum-entangled state "collapsed" to the state $[(+45)_1 (-45)_2]$. Consequently, if its partner photon is detected in the receiver 20, then this channel 2 photon will be detected in the "−45 degree detector", D3. In this case, the channel 1 photon is incident on detector D2 in the receiver 20, and the channel 2 photon is incident on detector D3 in the receiver 20. Therefore, this case can produce a two-photon coincidence detection event in the receiver 20. This D2/D3 two-photon coincidence detection event signals to the receiver that the transmitter is sending a binary zero message.

In the binary zero case, on average, one of every four pairs of down-converted photons can produce a two-photon coincidence detection event in the receiver 20. In the binary zero case, all two-photon coincidence detection events should be of the same unique type: the channel 1 photon detection will occur in detector D2 in the receiver 20 in coincidence with the channel 2 photon detection in detector D3.

In the binary zero case, the transmitter 15 keeps electro-optic modulator EOM1 turned off and electro-optic modulators EOM2 and EOM3 turned on for a predetermined amount of time. Based on the known statistics of the system and communications channel, this predetermined amount of time will allow a sufficient number of down-converted pairs of photons to pass through the system and be detected at the receiver 20 for a binary zero message to be successfully sent. The transmitter 15 then applies the correct voltages to the electro-optic modulators to send the next binary message.

To send a binary one message from the transmitter 15 to the receiver 20, the Transmitter 15 turns on electro-optic modulator EOM1 and turns off electro-optic modulators EOM2 and EOM3. EOM1 is kept turned on and EOM2 and EOM3 are kept turned off throughout the time required to send a binary one message.

The H polarized photon of a down-converted pair that exits aperture A1 in the source 25 travels through the optical communication channel 1 to the transmitter 15 and is incident on polarizer HP1, the first component of the transmitter 15. HP1 is set to transmit incident H polarized photons. After the H polarized channel 1 photon is transmitted through HP1, it passes through bandpass filter F1 and then travels to polarization rotator PR1. As it passes through PR1, the polarization direction of the channel 1 photon is rotated from H polarized to +45 degree polarized.

After exiting PR1, the now +45 degree polarized channel 1 photon is incident on polarizing beam splitter PBS1, the first component of polarization-dependent optical delay line ODLT in the transmitter 15. PBS1 divides the probability amplitude of each incident +45 degree polarized channel 1 photon into equal amplitude H polarized and V polarized components. The H polarized component enters the short (H) path in ODLT, and the V polarized component enters the long (V) path in ODLT. The H polarized component of the probability amplitude of the channel 1 photon travels through the short path in ODLT to polarizing beam splitter PBS2. The H polarized component is transmitted through PBS2 and travels to polarizing beam splitter PBS3.

The V polarized component of the probability amplitude of the channel 1 photon travels through the long path in ODLT via two mirrors (m) to polarizing beam splitter PBS2. The V polarized component is reflected by PBS2 and then travels to polarizing beam splitter PBS3. PBS3, the first component of the polarization detection section in the transmitter 15, is set to transmit incident +45 degree polarized photons into the "+45 degree channel" and to reflect incident −45 degree polarized photons into the "−45 degree channel".

After passing through ODLT, the probability that a channel 1 photon will be transmitted through PBS3 into the "+45 degree channel" and will be incident on polarization rotator PR2 is equal to 0.5. If a channel 1 photon is in fact incident on polarization rotator PR2 in the transmitter 15, then the photon must be +45 degree polarized. The polarization direction of the +45 degree polarized photon is rotated to V polarized as it passes through PR2. The now V polarized photon travels via mirror m to electro-optic modulator EOM1.

In the binary one case, EOM1 is "on". Consequently, the polarization direction of the photon is rotated as it passes through EOM1 from V polarized to H polarized. The now H polarized photon travels to PBS4. The H polarized photon is transmitted through PBS4 and is incident on detector D1 in the transmitter 15.

After passing through ODLT, the probability that a channel 1 photon will be reflected by PBS3 into the "−45 degree channel" and will be incident on polarization rotator PR3 is also equal to 0.5. If a channel 1 photon is in fact incident on polarization rotator PR3 in the transmitter 15, then the photon must be −45 degree polarized. The polarization direction of the −45 degree polarized photon is rotated to H polarized as it passes through PR3. The now H polarized photon travels via mirror m to electro-optic modulator EOM2.

In the binary one case, EOM2 is "off". Consequently, the H polarized photon passes through EOM2 unchanged and travels to PBS4. The H polarized photon is transmitted through PBS4 and travels to EOM3. In the binary one case, EOM3 is also "off".

In the binary one case, only an H polarized photon that passed through the −45 degree channel can reach EOM3. Since EOM3 is "off", the H polarized photon passes through EOM3 unchanged and travels to output polarizer HP2. The H polarized photon is transmitted through HP2 and exits the transmitter 15 via directing mirror dm. The H polarized photon then travels through the optical communication channel 1 to the receiver 20. When it reaches the receiver 20, the H polarized photon is transmitted through HP3 and is incident on detector D2 in the receiver 20.

In the binary one case, if a channel 1 photon is detected in detector D1 in the transmitter 15, then the photon must have been +45 degree polarized when it exited PBS3 in the transmitter 15. In the binary one case, if a channel 1 photon is detected in detector D2 in the receiver 20, then the photon must have been −45 degree polarized when it exited PBS3 in the transmitter 15.

The H polarized photon of a down-converted pair that exits aperture A2 in the source 25 and travels in channel 2 to the receiver 20 enters fixed-length optical delay line FODL. After passing through FODL, the H polarized channel 2 photon is incident on polarizer HP4. HP4 is set to transmit incident H polarized photons. After the H polarized channel 2 photon is transmitted through HP4, it passes through bandpass filter F2 and then travels to polarization rotator PR4. As it passes through PR4, the polarization direction of the channel 2 photon is rotated from H polarized to +45 degree polarized.

After exiting PR4, the now +45 degree polarized channel 2 photon is incident on polarizing beam splitter PBS5, the first component of polarization-dependent optical delay line ODLR in the receiver 20. PBS5 divides the probability amplitude of each incident channel 2 photon into equal amplitude H polarized and V polarized components. The H polarized component enters the short (H) path in ODLR, and the V polarized component enters the long (V) path in ODLR.

The H polarized component of the probability amplitude of the channel 2 photon travels through the short path in ODLR to polarizing beam splitter PBS6. The H polarized component is transmitted through PBS6 and travels to polarizing beam splitter PBS7. The V polarized component of the probability amplitude of the channel 2 photon travels through the long path in ODLR via two mirrors (m) to polarizing beam splitter PBS6. The V polarized component is reflected by PBS6 and then travels to PBS7. Polarizing beam splitter PBS7 is set to reflect incident −45 degree polarized photons to detector D3 and to transmit incident +45 degree polarized photons to detector D4. If a channel 2 photon is detected in detector D3 in the receiver 20, then that photon is −45 degree polarized. If a channel 2 photon is detected in detector D4 in the receiver 20, then that photon is +45 degree polarized.

The description of the path combinations for the binary one case is almost the same as the description for the binary zero case. The difference is that in the binary one case, if a channel 1 photon is detected in detector D2 in the receiver 20, that photon traveled through the "−45 degree channel" in the polarization detection section in the transmitter 15. Also, in the binary one case, if a channel 1 photon is detected in detector D1 in the transmitter 15, that photon traveled through the "+45 degree channel" in the polarization detection section in the transmitter 15.

Figure 7:
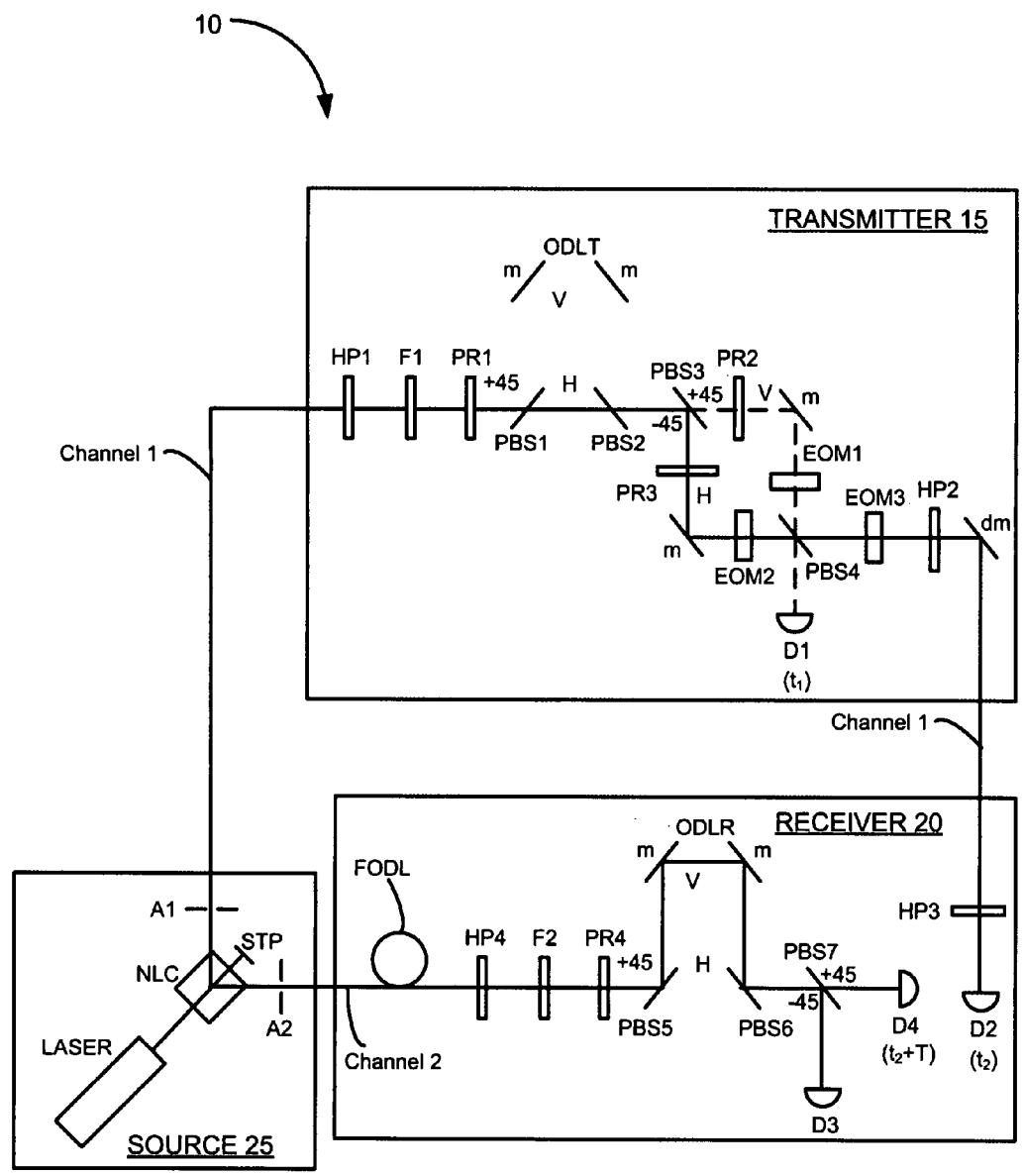
FIG. 7 is a schematic of the embodiment of the optical communication system illustrated in FIG. 2, showing a first path combination for a photon pair when a binary one is sent.

In the binary one case, the probability that the channel 1 and channel 2 photons of a down-converted pair travel through the system via any one of the four path combinations is equal to 0.25. Path combination one (PC1) in the binary one case is shown in FIG. 7. Note that, in the binary one case, only photons that are reflected at PBS3 into the "−45 degree channel" can exit the transmitter 15 and ultimately reach detector D2 in the receiver 20. Just as in the binary zero case, in the binary one case, path combination one (PC1) and path combination two (PC2) cannot yield two-photon coincidence detection events in the receiver 20.

Figure 8:
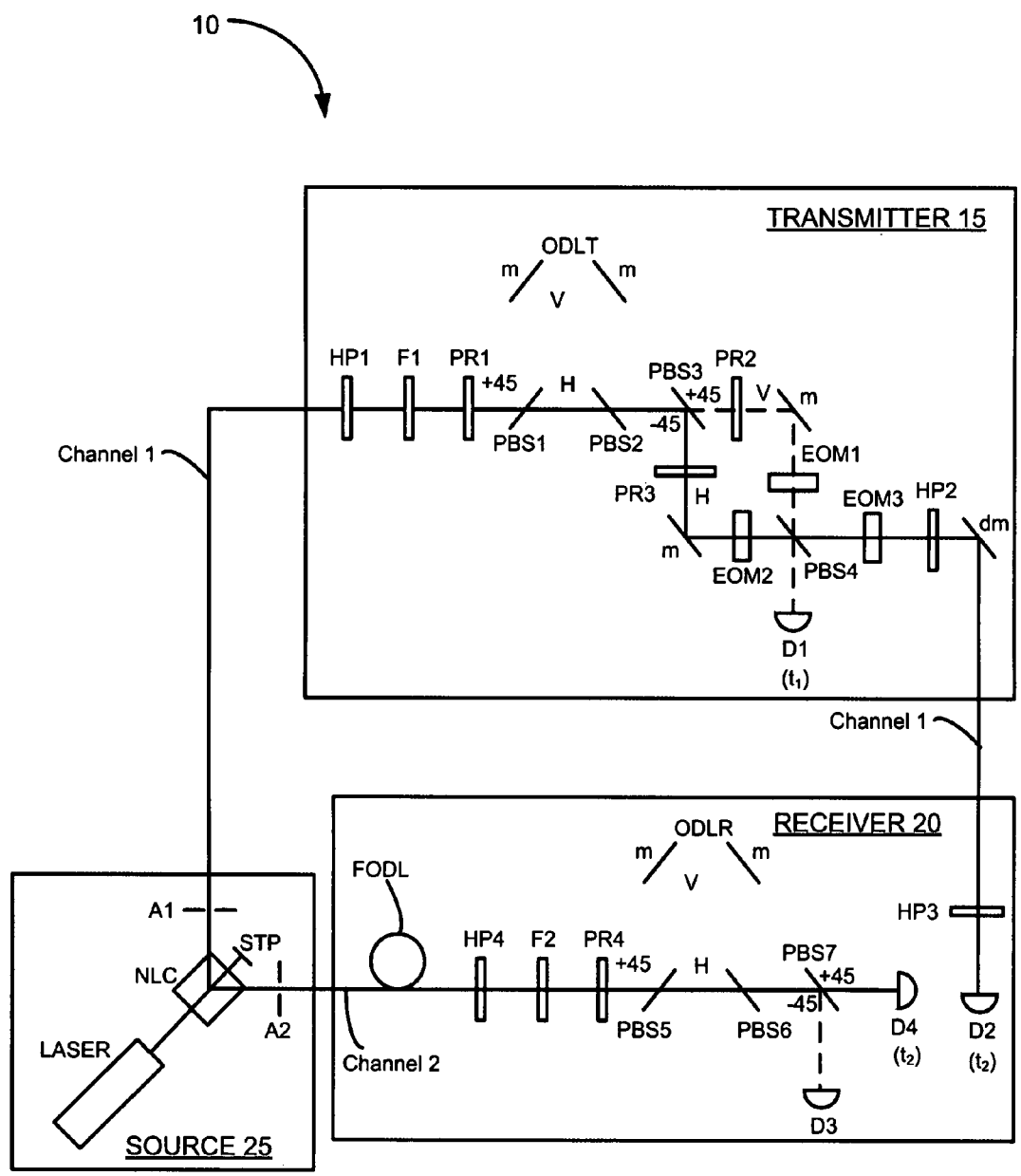
FIG. 8 is a schematic of the embodiment of the optical communication system illustrated in FIG. 2, showing another path combination for a photon pair when a binary one is sent.

Path combination three (PC3) in the binary one case is shown in FIG. 8. Again note that only photons that are reflected at PBS3 into the "−45 degree channel" can exit the transmitter 15 and ultimately reach detector D2 in the receiver 20. Just as in the binary zero case, in the binary one case, path combination three (PC3) is indistinguishable from path combination four (PC4). If both photons of a down-converted pair are detected or analyzed in +45/−45 degree polarization bases, and the two photon detections have the time difference and time order characteristic of PC3 (and PC4), then the paths that the channel 1 photon took through ODLT in the transmitter 15 and the channel 2 photon took through ODLR in the receiver 20 are indeterminate.

Consequently, in the binary one case, the quantum state of the channel 1 photon at the output of ODLT in the transmitter 15 and the channel 2 photon at the output of ODLR in the receiver 20 is shown in Equation 15:

$$(H_1H_2 - V_1V_2)/\sqrt{2} \qquad \text{Equation 15}$$

In the +45/−45 degree polarization basis in which the channel 1 and channel 2 photons are both analyzed, this "Bell Phi Minus" quantum-entangled state is shown in Equation 16:

$$[(+45)_1(-45)_2 + (-45)_1(+45)_2]/\sqrt{2} \qquad \text{Equation 16}$$

In the PC3/PC4 case for a binary one, if the channel 1 photon of a down-converted pair is detected in detector D1 in the transmitter 15, then the photon must have traveled through the +45 degree channel in the polarization detection section in the transmitter 15. Therefore, this channel 1 photon must have been +45 degree polarized when it exited PBS3 in the transmitter 15. This means that the quantum-entangled state "collapsed" to the state $[(+45)_1 (-45)_2]$. Consequently, if its partner photon is detected in the receiver 20, then this channel 2 photon will be detected in the "−45 degree detector", D3. Because the channel 1 photon is incident on detector D1 in the transmitter 15, this case cannot produce a two-photon coincidence detection event in the receiver 20.

In the PC3/PC4 case for a binary one, if the channel 1 photon of a down-converted pair is detected in detector D2 in the receiver 20, then this photon must have traveled through the −45 degree channel in the polarization detection section in the transmitter 15. Therefore, this channel 1 photon must have been −45 degree polarized when it exited PBS3 in the transmitter 15. This means that the quantum-entangled state "collapsed" to the state $[(-45)_1 (+45)_2]$. Consequently, if its partner photon is detected in the receiver 20, then this channel 2 photon will be detected in the "+45 degree detector", D4.

In this case, the channel 1 photon is incident on detector D2 in the receiver 20, and the channel 2 photon is incident on detector D4 in the receiver 20. Therefore, this case can produce a two-photon coincidence detection event in the receiver 20. This D2/D4 two-photon coincidence detection event signals to the receiver 20 that the transmitter 15 is sending a binary one message.

In the binary one case, on average, one of every four pairs of down-converted photons can produce a two-photon coincidence detection event in the receiver 20. In the binary one case, all two-photon coincidence detection events should be of the same unique type: the channel 1 photon detection will occur in detector D2 in the receiver 20 in coincidence with the channel 2 photon detection in detector D4.

Note that the two-photon coincidence detection events that occur in the binary one case are different from those that occur in the binary zero case. In all two-photon coincidence detection events in the binary zero case, the channel 1 photon detection will occur in detector D2 in the receiver 20 in coincidence with the channel 2 photon detection in detector D3.

By noting the type of two-photon coincidence detection events that occur, the receiver 20 can determine whether the transmitter 15 is sending a binary zero or a binary one. If the two-photon coincidence detection events at the receiver 20 are of the D2/D3 type, then a binary zero message is being sent from the transmitter 15 to the receiver 20. If the two-photon coincidence detection events at the receiver 20 are of the D2/D4 type, then a binary one message is being sent from the transmitter 15 to the receiver 20.

In the binary one case, the transmitter 15 keeps electro-optic modulator EOM1 turned on and electro-optic modulators EOM2 and EOM3 turned off for a predetermined amount of time. Based on the known statistics of the system and communications channel, this predetermined amount of time will allow a sufficient number of down-converted pairs of photons to pass through the system and be detected at the receiver 20 for a binary one message to be successfully sent. The transmitter 15 is then free to apply the correct voltages to the electro-optic modulators to send the next binary digit.

The optical communication system 10 described above may employ a suitable computing environment in any, or all of, the transmitter 15, receiver 20, or source 25. The optical communication system 10 may employ computer-executable instructions, such as program modules, being executed by a personal computer. Generally, program modules include routines, programs, objects, components, data structures, etc. that perform particular tasks, such as controlling the transmitter 15, receiver 20, and/or source 25. Moreover, those skilled in the art will appreciate that the optical communication system 10 may be practiced with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network, such as a local area network, a wide area network, an enterprise-wide computer network, an intranet and/or the Internet.

The optical communication system 10 may take the form of an embodiment combining software and hardware. As shown in FIG. 1, the optical communication system 10 has been described with reference to flowchart illustrations of methods according to one embodiment. It will be understood that each block of the flowchart illustration can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart.

It will be understood that many additional changes in the details, materials, steps and arrangement of parts, which have been herein described and illustrated to explain the nature of the optical communication system 10, may be made by those skilled in the art within the principal and scope of the optical communication system 10 as expressed in the appended claims. That is, one skilled in the art will appreciate that the optical communication system 10 described above can be practiced by other than the above-described embodiments, which are presented in this description for purposes of illustration and not of limitation. The specification and drawings are not intended to limit the exclusionary scope of this patent document. While the optical communication system 10 has been described in conjunction with specific embodiments, it is evident that many alternatives, modifications, permutations and variations will become apparent to those of ordinary skill in the art in light of the foregoing description. Accordingly, it is intended that the optical communication system 10 embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A communication method, comprising the steps of:

creating a multiplicity of photon pairs, with each photon pair comprising a first and a second photon;

sending first photons of the photon pairs to a transmitter and then sending at least some of the first photons received at the transmitter to a receiver;

wherein the step of sending the first photons to the transmitter and then sending at least some of the first photons received at the transmitter to the receiver comprises the steps of:
sending the first photon to the transmitter;
providing at least two alternate paths for the first photon;
determining the polarization direction of the first photon; and
detecting the first photon at a photon detector in the transmitter or, depending upon the path taken by the first photon, detecting the first photon at a photon detector in the receiver;
sending second photons of the photon pairs to the receiver; and
transmitting data, as received at the receiver, in a photon pair of the multiplicity of photon pairs based upon photon polarization direction and time of detection with respect to each other of the first and second photons of the photon pair that are received at the receiver.

2. A communication method, comprising the steps of:
creating a multiplicity of photon pairs, with each photon pair comprising a first and a second photon;
sending first photons of the photon pairs to a transmitter and then sending at least some of the first photons received at the transmitter to a receiver;
sending second photons of the photon pairs to the receiver; and
transmitting data, as received at the receiver, in a photon pair of the multiplicity of photon pairs based upon photon polarization direction and time of detection with respect to each other of the first and second photons of the photon pair that are received at the receiver;
where the step of transmitting data comprises the steps of:
receiving the first and second photons of the photon pair at the receiver;
determining the polarization direction of the first and second photons;
detecting the first and second photons and determining whether the time of detection of the first and second photons is at a substantially same time; and
assigning a binary zero bit to a photon pair that is received at the substantially same time and whose second photon of the photon pair has a negative 45 degree polarization direction.

3. A communication method, comprising the steps of:
creating a multiplicity of photon pairs, with each photon pair comprising a first and a second photon;
sending first photons of the photon pairs to a transmitter and then sending at least some of the first photons received at the transmitter to a receiver;
sending second photons of the photon pairs to the receiver; and
transmitting data, as received at the receiver, in a photon pair of the multiplicity of photon pairs based upon photon polarization direction and time of detection with respect to each other of the first and second photons of the photon pair that are received at the receiver;
where the step of transmitting data comprises the steps of:
receiving the first and second photons of the photon pair at the receiver;
determining the polarization direction of the first and second photons;
detecting the first and second photons determining whether the detection of the first and second photon is at a substantially same time; and
assigning a binary one bit to a photon pair that is received at the substantially same time and whose second photon has a positive 45 degree polarization direction.

4. An apparatus, comprising:
a photon source comprising a laser, a non-linear crystal, and at least two apertures;
a transmitter comprising at least three electro-optic modulators, at least four polarizing beam splitters, and a photon detector, wherein the transmitter sends data by turning off one of the at least three electro-optic modulators and turning on the remaining two electro-optic modulators; and
a receiver comprising at least three polarizing beam splitters, and at least three photon detectors.

5. An apparatus, comprising:
a photon source comprising a laser, a non-linear crystal, and at least two apertures;
a transmitter comprising at least three electro-optic modulators, at least four polarizing beam splitters, and a photon detector, wherein the transmitter sends data by turning on one of the at least three electro-optic modulators and turning off the remaining two electro-optic modulators; and
a receiver comprising at least three polarizing beam splitters, and at least three photon detectors.

6. A communication apparatus, comprising:
means for creating a multiplicity of photon pairs, with each photon pair comprising a first and a second photon;
means for sending the first photon either to a transmitter, or to the transmitter and then to a receiver, where the means for sending the first photon either to the transmitter, or to the transmitter and then to the receiver, comprise:
means for sending the first photon to the transmitter;
means for providing at least two alternate paths for the first photon;
means for determining the polarization direction of the first photon; and
means for detecting the first photon at a photon detector in the transmitter or detecting the first photon at a photon detector in the receiver;
means for sending the second photon to the receiver; and
means for transmitting data by determining a polarization direction and a time of detection of photon pairs that are received at the receiver.

7. A communication apparatus, comprising:
means for creating a multiplicity of photon pairs, with each photon pair comprising a first and a second photon;
means for sending the first photon either to a transmitter, or to the transmitter and then to a receiver;
means for sending the second photon to the receiver; and
means for transmitting data by determining a polarization direction and a time of detection of photon pairs that are received at the receiver, where the means for transmitting data comprise:
means for receiving the first and second photons of a photon pair at the receiver;
means for determining the polarization direction of the first and second photon;
means for determining the time of detection of the first and second photon; and
means for assigning a binary zero bit to a photon pair that is received at a substantially same time, and where the second photon has a negative 45 degree polarization direction.

8. A communication apparatus, comprising:
means for creating a multiplicity of photon pairs, with each photon pair comprising a first and a second photon;

means for sending the first photon either to a transmitter, or to the transmitter and then to a receiver;

means for sending the second photon to the receiver; and means for transmitting data by determining a polarization direction and a time of detection of photon pairs that are received at the receiver, where the means for transmitting data comprise:

means for receiving the first and second photons of a photon pair at the receiver;

means for determining the polarization direction of the first and second photon;

means for determining the time of detection of the first and second photon; and means for assigning a binary one bit to a photon pair that is received at a substantially same time, and where the second photon has a positive 45 degree polarization direction.

* * * * *